(12) United States Patent
Nakazawa et al.

(10) Patent No.: US 10,996,923 B2
(45) Date of Patent: May 4, 2021

(54) DISPLAY CONTROL DEVICE, DISPLAY CONTROL SYSTEM, AND DISPLAY CONTROL METHOD

(71) Applicant: SHARP KABUSHIKI KAISHA, Sakai (JP)

(72) Inventors: Go Nakazawa, Sakai (JP); Satoshi Terada, Sakai (JP); Keiko Hirukawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 215 days.

(21) Appl. No.: 16/279,256

(22) Filed: Feb. 19, 2019

(65) Prior Publication Data

US 2019/0258455 A1   Aug. 22, 2019

(30) Foreign Application Priority Data

Feb. 19, 2018   (JP) .............................. JP2018-027015

(51) Int. Cl.
| | |
|---|---|
| G10L 15/22 | (2006.01) |
| G06F 40/30 | (2020.01) |
| G06F 3/16 | (2006.01) |
| G06F 3/038 | (2013.01) |
| G10L 17/00 | (2013.01) |

(52) U.S. Cl.
CPC .............. G06F 3/167 (2013.01); G06F 3/038 (2013.01); G10L 15/22 (2013.01); G10L 17/00 (2013.01)

(58) Field of Classification Search
CPC ................................. H04M 1/00; G11B 27/00
See application file for complete search history.

(56) References Cited

U.S. PATENT DOCUMENTS

| | | | | |
|---|---|---|---|---|
| 6,157,705 A | * | 12/2000 | Perrone | G06F 16/3334 |
| | | | | 379/88.01 |
| 7,145,609 B2 | | 12/2006 | Kim | |
| 7,298,960 B1 | * | 11/2007 | Taylor | G11B 27/034 |
| | | | | 348/E5.007 |
| 8,050,713 B2 | * | 11/2011 | Ransom | H04M 1/7253 |
| | | | | 455/557 |

(Continued)

FOREIGN PATENT DOCUMENTS

| | | |
|---|---|---|
| CN | 1434366 A | 8/2003 |
| CN | 105491413 A | 4/2016 |
| JP | 2014021493 A | 2/2014 |

*Primary Examiner* — Shreyans A Patel
(74) *Attorney, Agent, or Firm* — ScienBiziP, P.C.

(57) ABSTRACT

A display control device controls a display device. The display device includes two or more input units to which information processing devices are connected. The display control device includes a storage unit, a determination unit, and a command generation unit. The storage unit stores device information and reception status information. The device information indicates a state of each of the information processing devices. The reception status information indicates one of the information processing devices, which outputs a display image displayed by the display device. The determination unit determines a content of an instruction from an user. The command generation unit generates a command to be issued to at least one of the display device and the information processing devices based on a determination result of the determination unit and the information stored in the storage unit.

7 Claims, 22 Drawing Sheets

(56) References Cited

U.S. PATENT DOCUMENTS

| | | |
|---|---|---|
| 9,288,421 B2 | 3/2016 | Cha et al. |
| 2003/0140352 A1 | 7/2003 | Kim |
| 2011/0185437 A1* | 7/2011 | Tran ................. H04L 63/104 |
| | | 726/28 |
| 2013/0342456 A1* | 12/2013 | Choi ................. G06F 3/017 |
| | | 345/158 |
| 2014/0019140 A1 | 1/2014 | Cha et al. |
| 2016/0098239 A1 | 4/2016 | Lee et al. |
| 2019/0258455 A1* | 8/2019 | Nakazawa ............ G10L 15/22 |

\* cited by examiner

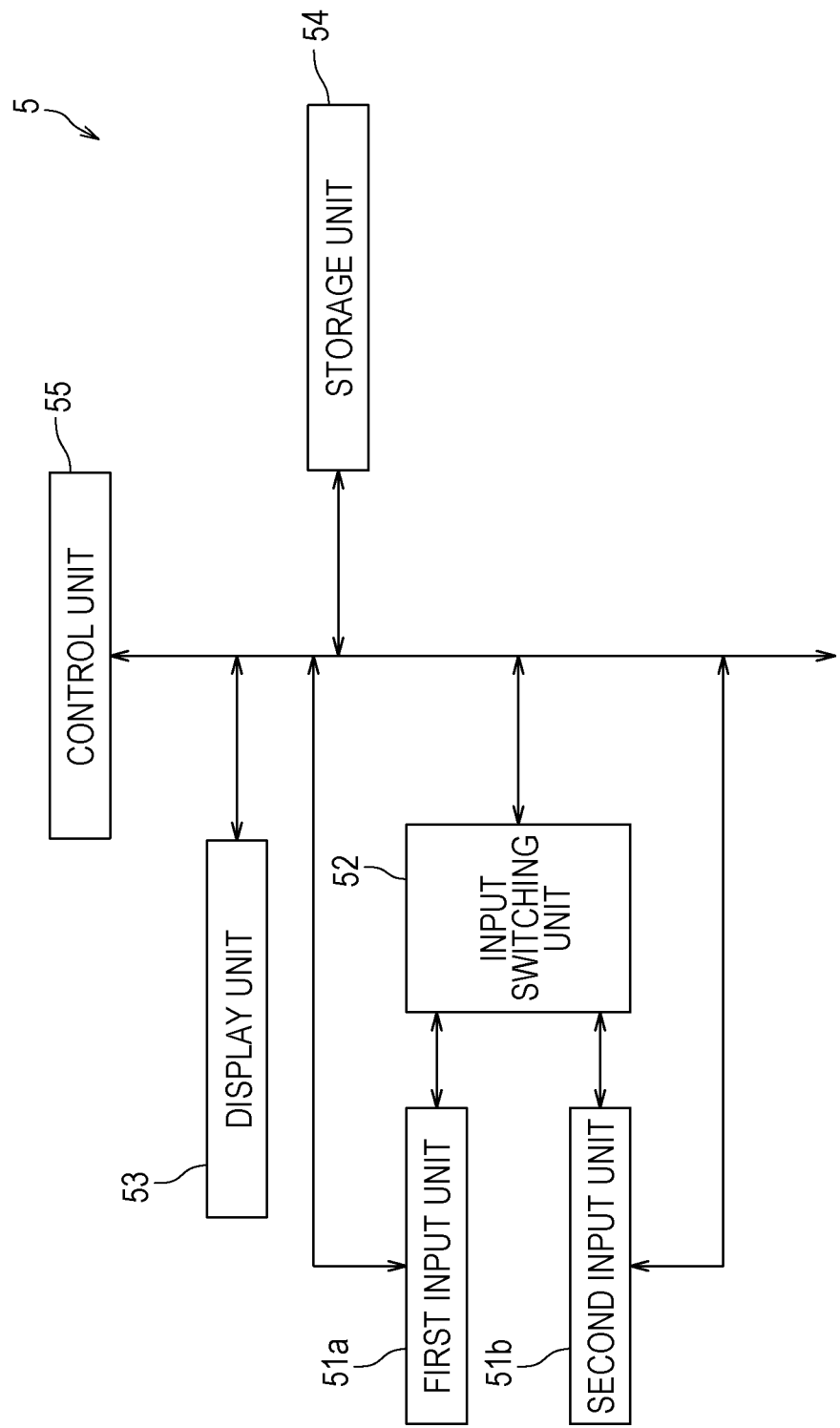

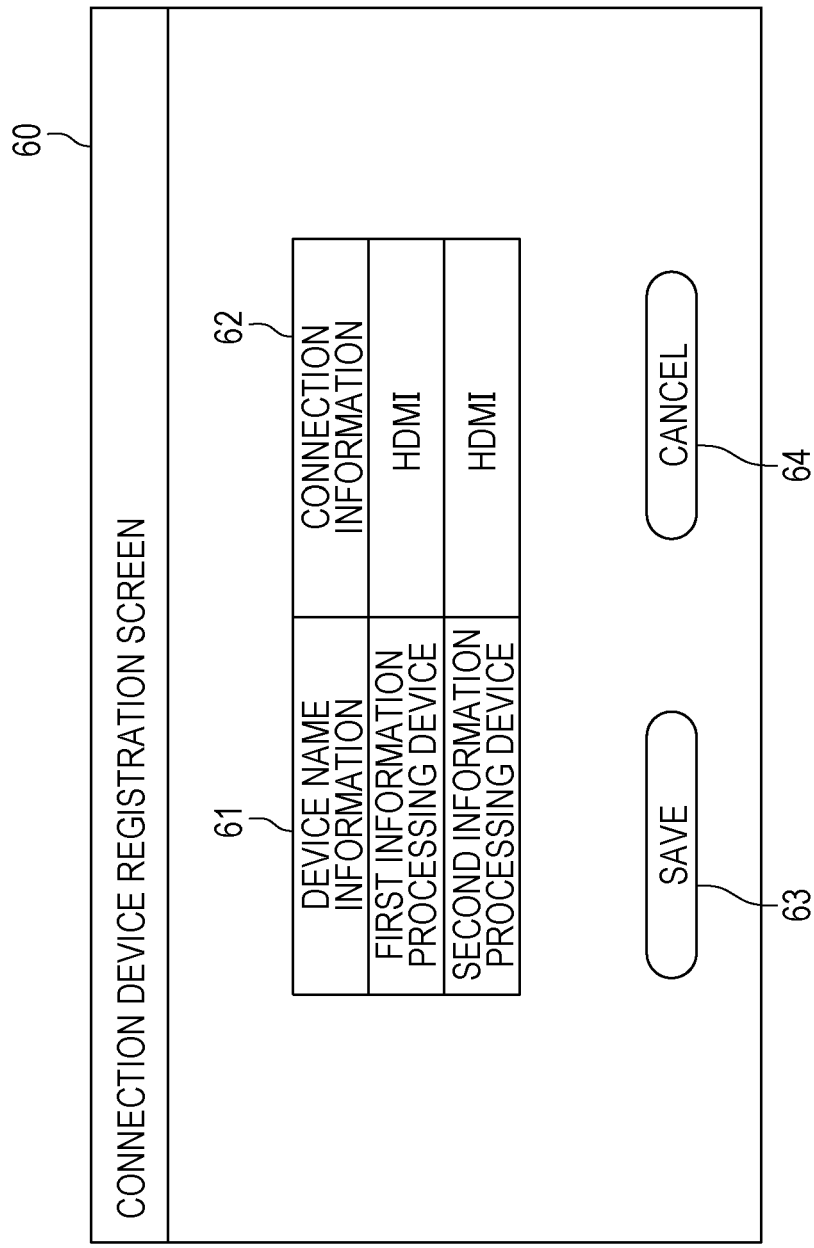

| DEVICE NAME INFORMATION (71) | MICROPHONE | SPEAKER | CAMERA | CONNECTION INFORMATION (73) | APPLICATION INFORMATION (74) |
|---|---|---|---|---|---|
| FIRST INFORMATION PROCESSING DEVICE | CONNECTION | CONNECTION | CONNECTION | HDMI | TELECONFERENCE APPLICATION NOT ACTIVATED |
| SECOND INFORMATION PROCESSING DEVICE | NO CONNECTION | NO CONNECTION | NO CONNECTION | HDMI | TELECONFERENCE APPLICATION NOT ACTIVATED |

(columns Microphone/Speaker/Camera grouped as 72)

| DEVICE NAME INFORMATION (81) | CONNECTION INFORMATION (82) |
|---|---|
| SECOND INFORMATION PROCESSING DEVICE | HDMI |

| DEVICE NAME INFORMATION | MICROPHONE | SPEAKER | CAMERA | CONNECTION INFORMATION | APPLICATION INFORMATION | |
|---|---|---|---|---|---|---|
| | | | | | TELECONFERENCE APPLICATION | IMAGE TRANSMISSION APPLICATION |
| FIRST INFORMATION PROCESSING DEVICE | CONNECTION | CONNECTION | CONNECTION | HDMI | IN CONFERENCE | NOT ACTIVATED |
| SECOND INFORMATION PROCESSING DEVICE | NO CONNECTION | NO CONNECTION | NO CONNECTION | D-Sub | NOT ACTIVATED | |

| DEVICE NAME INFORMATION | CONNECTION INFORMATION |
|---|---|
| FIRST INFORMATION PROCESSING DEVICE | HDMI |

DISPLAY CONTROL DEVICE, DISPLAY CONTROL SYSTEM, AND DISPLAY CONTROL METHOD

BACKGROUND

1. Field

The present disclosure relates to a display control device, a display control system, and a display control method.

2. Description of the Related Art

Japanese Unexamined Patent Application Publication No. 2014-021493 discloses a broadcast receiving device that switches inputs by using a voice recognition technology. According to the broadcast receiving device disclosed in Japanese Unexamined Patent Application Publication No. 2014-021493, when a call word is included in the user's voice, the broadcast receiving device activates an external input terminal to which an external input device corresponding to the call word is connected and di plays an image received from the external input device corresponding the user's voice. The call word disclosed in Japanese Unexamined Patent Application Publication No. 2014-021493 is video, DVD, and Blu-ray, for example, and when the call word is video, the broadcast receiving device activates the external input terminal connected to the video device.

However, the broadcast receiving device disclosed in Japanese Unexamined Patent Application Publication No. 2014-021493 activates an input terminal to which an external input device corresponding to a call word is connected, regardless of a state the external input device is in. Therefore, it is not possible to control input switching according to the state of the external input device.

It is desirable to provide a display control device, a display control system, and a display control method, which are capable of controlling input switching of a display device according to a state of an information processing device connected to the display device.

SUMMARY

According to an aspect of the disclosure, there is provided a display control device that controls a display device. The display device includes two or more input units to which information processing devices are connected. The display control device includes a storage unit, a determination unit, and a command generation unit. The storage unit stores device information and reception status information. The device information indicates a state of each of the information processing devices. The reception status information indicates one of the information processing devices, which outputs a display image to be displayed by the display device. The determination unit determines a content of an instruction from an user. The command generation unit generates a command to be issued to at least one of the display device and the information processing devices based on a determination result of the determination unit and the information stored in the storage unit.

According to another aspect of the disclosure, there is provided a display control system that includes a display device and a display control device for controlling the display device. The display device includes two or more input units to which information processing devices are connected. The display control device includes a storage unit, a determination unit, and a command generation unit. The storage unit stores device information and reception status information. The device information indicates a state of each of the information processing devices. The reception status information indicates one of the information processing devices, which outputs a display image to be displayed by the display device. The determination unit determines a content of an instruction from an user. The command generation unit generates a command to be issued to at least one of the display device and the information processing devices based on the determination result of the determination unit and the information stored in the storage unit. The display device displays an image according to the command.

According to still another aspect of the disclosure, there is provided a display control method that includes a method of controlling a display device. The display device includes two or more input units to which information processing devices are connected. The display control method includes storing device information for indicating a state of each of the information processing devices and reception status information for indicating one of the information processing devices, which outputs a display image displayed by the display device, determining a content of an instruction from an user, generating a command to be issued to at least one of the display device and the information processing devices based on a result determined in the determining and the information stored in the storing, and displaying an image corresponding to the command by the display device.

BRIEF DESCRIPTION OF THE DRAWINGS

FIG. 5 is a diagram showing a configuration of a display device according to Embodiment 1 of the present disclosure;

FIG. 6 is a diagram showing an example of a connection device registration screen according to Embodiment 1 of the present disclosure;

FIG. 7A is a diagram showing an example of a first management table according to Embodiment 1 of the present disclosure;

FIG. 7B is a diagram showing an example of a second management table according to Embodiment 1 of the present disclosure;

FIG. 22A is a diagram showing an example of a first management table according to Embodiment 3 of the present disclosure;

FIG. 22B is a diagram showing an example of a second management table according to Embodiment 3 of the present disclosure;

DESCRIPTION OF THE EMBODIMENTS

Figure 1:
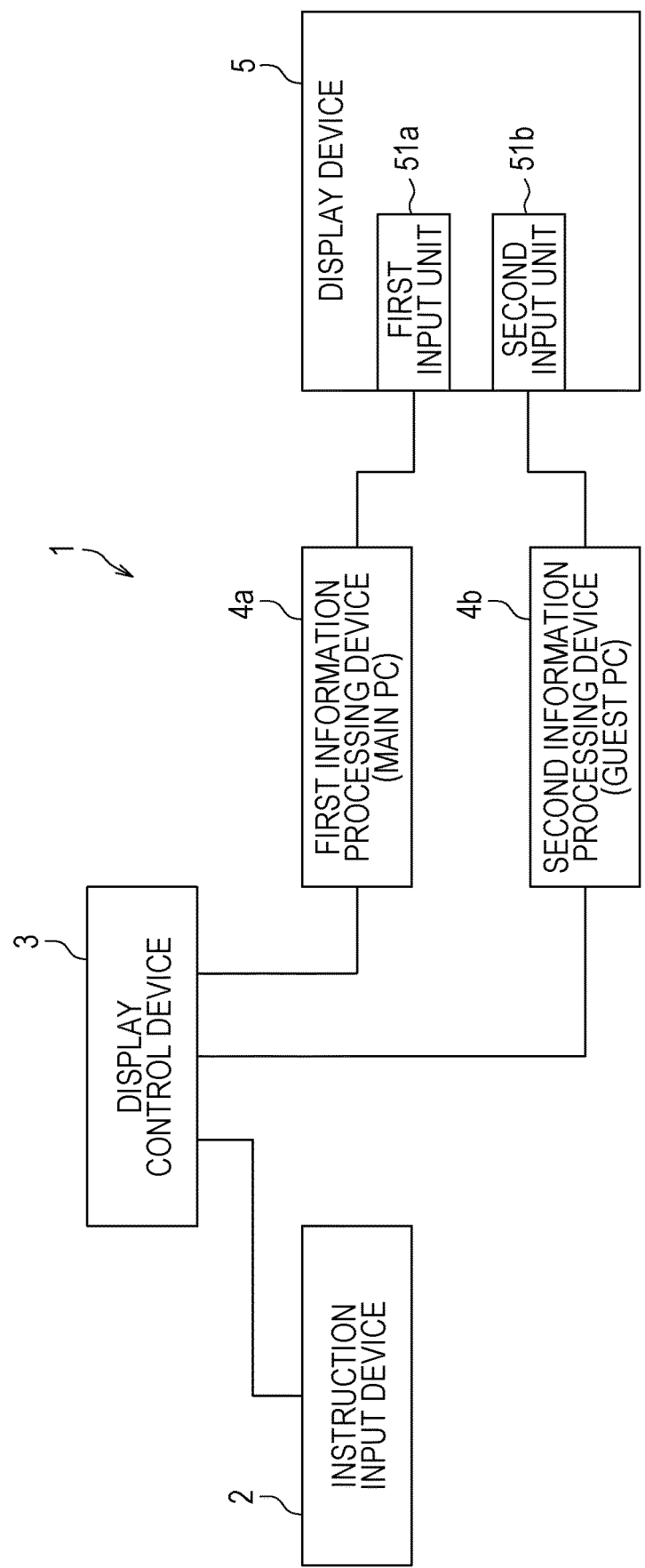
FIG. 1 is a diagram showing a display control system according to Embodiment 1 of the present disclosure.

Hereinafter, embodiments of the present disclosure will be described with reference to the drawings. However, the present disclosure is not limited to the following embodiments. In the drawings, the same or corresponding parts are denoted by the same reference numerals, and description thereof will not be repeated. In addition, as for parts where explanations overlap, explanations may not be repeated as appropriate.

Embodiment 1

FIG. 1 is a diagram showing a d splay control system 1 according to Embodiment 1. As shown in FIG. 1, the display control system 1 includes an instruction input device 2, a display control device 3, a first information processing device 4a, a second information processing device 4b, and a display device 5.

The instruction input device 2 inputs an instruction from an user and transmits data indicating the input instruction to the display control device 3. In the present embodiment, the instruction input device 2 is a voice input device, receives the voice uttered by the user, converts the received voice into a digital signal (voice data), and transmits the digital signal to the display control device 3. Hereinafter, the voice uttered by the user may be referred to as "user voice". The instruction input device 2 is a speaker microphone device such as a smart speaker, for example.

The display control device 3 is an information processing device such as a cloud server or a personal computer (PC), for example. The display control device 3 communicates with the instruction input device 2, the first information processing device 4a, and the second information processing device 4b through the Internet connection, for example. Alternatively, the display control device 3 communicates with the instruction input device 2, the first information processing device 4a, and the second information processing device 4b through local area network (LAN) cables or wireless LAN.

The display control device 3 controls input switching of the display device 5 based on the voice data (user voice) transmitted from the instruction input device 2. In other words, the display control device 3 controls the input switching of the display device 5 in accordance with an instruction from the user input to the instruction input device 2. Specifically, the display device 5 includes a first input unit 51a and a second input unit 51b. The display control device 3 determines whether to display the image received by the first input unit 51a on the display device 5 or to display the image received by the second input unit 51b on the display device 5 in accordance with the instruction from the user.

Specifically, the display control device 3 stores device information and reception status information. The device information indicates the respective states of the first information processing device 4a and the second information processing device 4b. The reception status information indicates whether the information processing device that outputs the image displayed by the display device 5 is the first information processing device 4a or the second information processing device 4b. The display control device 3 determines the content of the instruction from the user, and generates a command based on the determination result and the stored information. The command includes a switching command for executing input switching. In the present embodiment, the command is issued to the first information processing device 4a or to the second information processing device 4b.

The first information processing device 4a is connected to the first input unit 51a. The first information processing device 4a outputs the image signal to the first input unit 51a. The second information processing device 4b is connected to the second input unit 51b. The second information processing device 4b outputs the image signal to the second input unit 51b. Each of the first information processing device 4a and the second information processing device 4b is a set-top box, a PC, or a tablet terminal, for example. In the present embodiment, the first information processing device 4a is a main PC and the second information processing device 4b is a guest PC.

In the present embodiment, the first information processing device 4a and the second information processing device 4b execute a processing corresponding to the command issued from the display control device 3. When the first information processing device 4a or the second information processing device 4b executes a processing corresponding to the command, the display device 5 displays an image corresponding to the command.

Specifically, when receiving a switching command from the display control device 3, the first information processing device 4a or the second information processing device 4b outputs an input switching signal. The input switching signal output from the first information processing device 4a indicates an instruction to switch the image displayed by the display device 5 to the image output from the first information processing device 4a. When the first input unit 51a receives the input switching signal, the display device 5 displays the image output from the first information processing device 4a. Likewise, the input switching signal output from the second information processing device 4b indicates an instruction to switch the image displayed by the display device 5 to the image output from the second information processing device 4b. When the second input unit 51b receives the input switching signal, the display device 5 displays the image output from the second information processing device 4b. In the present embodiment, the first input unit 51a and the second input unit 51b are video interfaces such as HDMI (registered trademark) terminals.

In the following description, an image displayed by the display device 5 will be referred to as "display image", and an information processing device for outputting the display image be referred to as "display image output device" in some cases. In addition, the input unit to which the display image output device is connected may be referred to as "display image reception unit" in some cases.

Figure 2:
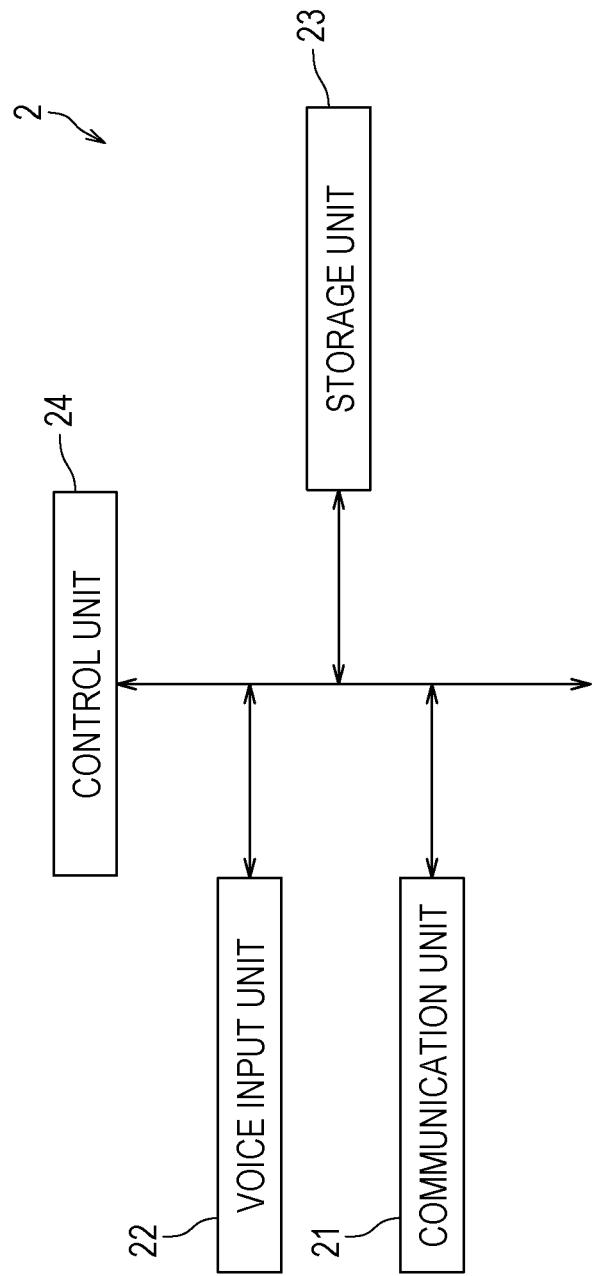
FIG. 2 is a diagram showing a configuration of an instruction input device according to Embodiment 1 of the present disclosure.

Next, the configuration of the instruction input device 2 will be described with reference to FIGS. 1 and 2. FIG. 2 is a diagram showing a configuration of the instruction input device 2 according to Embodiment 1. As shown in FIG. 2, the instruction input device 2 includes a communication unit 21, a voice input unit 22, a storage unit 23, and a control unit 24.

The communication unit 21 controls communication with the display control device 3. Specifically, the communication unit 21 transmits the voice data to the display control device 3. The communication unit 21 is a LAN board or a wireless LAN board, for example.

The voice input unit 22 collects the user voice and converts the user voice into an analog electric signal. The analog electric signal is input to the control unit 24. The voice input unit 22 is a microphone, for example.

The storage unit 23 includes a semiconductor memory such as a Random Access Memory (RAM) and a Read Only Memory (ROM), for example. The storage unit 23 may further include a storage device such as a Hard Disk Drive (HDD). The storage unit 23 stores a control program to be executed by the control unit 24.

The control unit 24 includes a processor such as a Central Processing Unit (CPU) or Micro Processing Unit (MPU), for example. In addition, the control unit 24 (computer) controls the operation of the instruction input device 2 based on the control program (computer programs) stored in the storage unit 23. In the present embodiment, the control unit 24 converts the analog electric signal input from the voice input unit 22 into a digital signal (voice data), and causes the communication unit 21 to transmit the digital signal.

Figure 3:
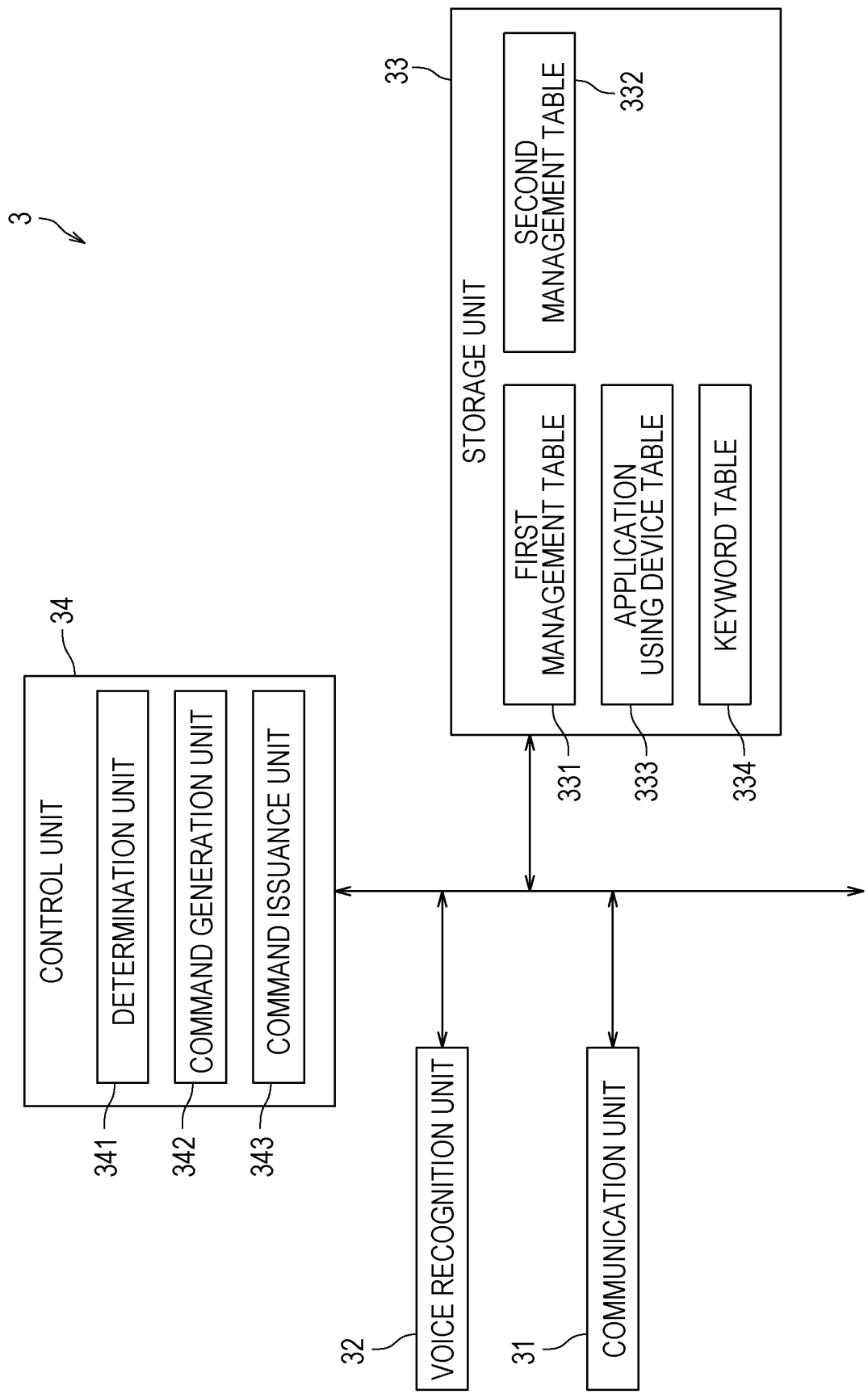
FIG. 3 is a diagram showing a configuration of a display control device according to Embodiment 1 of the present disclosure.

Next, a configuration of the display control device 3 will be described with reference to FIGS. 1 and 3. FIG. 3 is a diagram showing a configuration of the display control device 3 according to Embodiment 1. As shown in FIG. 3, the display control device 3 includes a communication unit 31, a voice recognition unit 32, a storage unit 33, and a control unit 34.

The communication unit 31 is a LAN board or a wireless LAN board, for example. The communication unit 31 controls communication with the instruction input device 2, communication with the first information processing device 4a, and communication with the second information processing device 4b. Specifically, the communication unit 31 receives voice data from the instruction input device 2. In addition, the communication unit 31 transmits a command (issues a command) to the first information processing device 4a and the second information processing device 4b.

In the present embodiment, the communication unit 31 receives a command request signal for requesting issuance of a command from the first information processing device 4a and the second information processing device 4b.

The voice recognition unit 32 converts the voice data received from the instruction input device 2 to text information (hereinafter sometimes referred to as "recognition result text") by voice recognition technique. The voice recognition unit 32 is a Large Scale Integration (LSI) for voice recognition, for example.

The storage unit 33 includes a semiconductor memory such as a RAM and a ROM, for example. Furthermore, the storage unit 33 includes a storage device such as an HDD. The storage unit 33 stores a control program to be executed by the control unit 34.

In the present embodiment, the storage unit 33 stores a first management table 331, a second management table 332, an application using device table 333, and a keyword table 334.

In the first management table 331, device information is registered. Specifically, connection information, peripheral device information, and application information are registered in the first management table 331.

The connection information indicates an output unit of the first information processing device 4a connected to the display device 5. In addition, the connection information indicates an output unit of the second information processing device 4b connected to the display device 5. Therefore, the connection information indicates the input unit of the display device 5 connected to the first information processing device 4a and the input unit of the display device 5 connected to the second information processing device 4b. In the present embodiment, an output unit connected to the first input unit 51a is registered as an output unit of the first information processing device 4a connected to the display device 5. In addition, an output unit connected to the second input unit 51b is registered as an output unit of the second information processing device 4b connected to the display device 5. Alternatively, the first input unit 51a is registered as the input unit of the display device 5 connected to the first information processing device 4a, and the second input unit 51b is registered as the input unit of the display device 5 connected to the second information processing device 4b.

The peripheral device information indicates peripheral devices connected to the first information processing device 4a and the second information processing device 4b. The application information indicates application software installed in the first information processing device 4a and the second information processing device 4b. The application information further indicates whether or not the application software installed in the first information processing device 4a and the second information processing device 4b is in operation. In the following description, the application software may be referred to as "application" in some cases.

In the second management table 332, reception status information is registered. More specifically, in the second management table 332, information for indicating the display image output device and information for indicating the display image reception unit are registered.

In the application using device table 333, information for indicating a specific application and information for indicating a peripheral device related to the specific application are registered. The specific applications and the peripheral devices may be registered in advance or may be registered by the user. The peripheral devices related to a specific application are devices used for the operation of the specific application, for example. Specifically, when the specific application is a teleconference application such as a video conference application and a web conference application, information for indicating a microphone, a speaker, and a video capturing camera is registered as information for indicating the peripheral device.

In the keyword table 334, keywords indicating functions to be executed by the specific application are registered. For example, "video conference", "web conference", and the like are registered as keywords Indicating functions to be executed by the teleconference application. In addition, in the keyword table 334, a keyword indicating a teleconference partner (connection destination of the teleconference application) is registered. For example, "Mr. ○○", "Mrs. △△", and the like are registered as keywords indicating the teleconference partner.

The control unit 34 includes a processor such as a CPU or MPU, for example. In addition, the control unit 34 (computer) controls the operation of the display control device 3 based on the control program (computer program) stored in the storage unit 33. In the present embodiment, the control unit 34 serves as the determination unit 341, the command generation unit 342, and the command issuance unit 343 by executing the control program.

The determination unit 341 determines the content of the instruction from the user. In the present embodiment, the determination unit 341 determines the content of the instruction from the user based on the recognition result text and the information stored in the storage unit 33. Specifically, the determination unit 341 determines whether or not the keyword registered in the keyword table 334 is included in the recognition result text. In addition, the determination unit 341 extracts the keywords registered in the keyword table 334 from the recognition result text.

The command generation unit 342 generates a command to be issued to the first information processing device 4a or the second information processing device 4b based on the determination result of the determination unit 341 and the information stored in the storage unit 33. In addition, the command generation unit 342 causes the storage unit 33 to store the generated command.

In the present embodiment, the command generation unit 342 generates a command based on the keywords extracted by the determination unit 341, the information registered in the first management table 331, the information registered in the second management table 332, and the information registered in the application using device table 333.

Specifically, the command generation unit 342 determines an instruction correspondence application, which is an application used for executing instructions from the user, from the extracted keywords. In addition, the command generation unit 342 determines a specific peripheral device related to the instruction correspondence application with reference to the application using device table 333. In addition, the command generation unit 342 determines an instruction correspondence device which is an information processing device connect to the specific peripheral device from among the first information processing device 4a and the second information processing device 4b with reference to the first management table 331. In addition, the command generation unit 342 determines whether or not to generate a switching command with reference to the second management table 332. Specifically, the command generation unit determines whether or not the display image output device is the instruction correspondence device. The switching command switches the display image to the image output from the instruction correspondence device.

In addition, the command generation unit 342 generates a first function execution command or a second function execution command. Specifically, the command generation unit 342 determines whether or not the instruction correspondence application installed in the instruction correspondence device is in operation with reference to the first management table 331. When the instruction correspondence application is not in operation, the command generation unit 342 generates the first function execution command. The first function execution command indicates an instruction to activate the instruction correspondence application and an instruction to cause the instruction correspondence application to execute a function corresponding to the instruction from the user. On the other hand, when the instruction correspondence application is in operation, the command generation unit 342 generates the second function execution command. The second function execution command indicates an instruction to cause the instruction correspondence application to execute a function corresponding to the instruction from the user.

When the communication unit 31 receives the command request signal from the first information processing device 4a, the command issuance unit 343 reads a command to be issued to the first information processing device 4a from the storage unit 33, and issues the command to the first information processing device 4a. Likewise, when the communication unit 31 receives a command request signal from the second information processing device 4b, the command issuance unit 343 reads a command to be issued to the second information processing device 4b from the storage unit 33, and issues the command to the second information processing device 4b.

The configuration of the display control device 3 is described above with reference to FIGS. 1 and 3. While the display control device 3 shown in FIG. 3 includes the voice recognition unit 32, the control unit 34 may have the function of the voice recognition unit 32. In this case, the voice recognition unit 32 is not included in the display control device 3 as an individual part.

Figure 4:
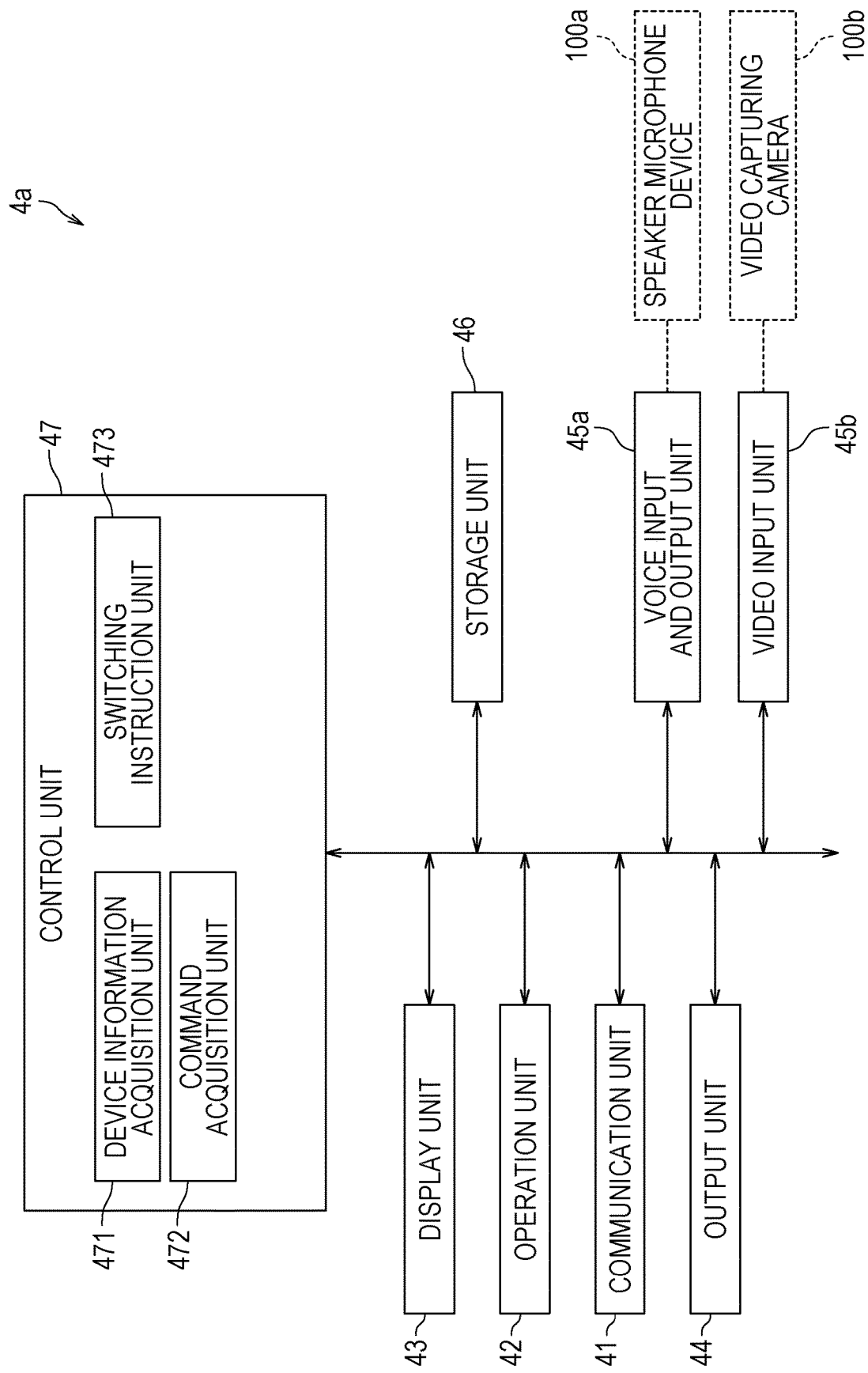
FIG. 4 is a diagram showing a configuration of a first information processing device according to Embodiment 1 of the present disclosure.

Next, the configuration of the first information processing device 4a will be described with reference to FIGS. 1, 3, and 4. FIG. 4 is a diagram showing a configuration of the first information processing device 4a according to Embodiment 1. As shown in FIG. 4, the first information processing device 4a includes a communication unit 41, an operation unit 42, a display unit 43, an output unit 44, a voice input and output unit 45a , a video input unit 45b, a storage unit 46, and a control unit 47.

The communication unit 41 controls communication with the display control device 3. Specifically, the communication unit 41 transmits a command request signal to the display control device 3, and receives a command from the display control device 3. The communication unit 41 is a LAN board or a wireless LAN board, for example.

The operation unit 42 is operated by the user and accepts an instruction from the user. The operation unit 42 outputs a signal corresponding to the operation of the user to the control unit 47. As a result, the first information processing device 4a executes a process corresponding to the operation accepted by the operation unit 42. The operation unit 42 includes a pointing device and a keyboard, for example. In addition, the operation unit 42 may include a touch sensor. The touch sensor is overlaid on the display surface of the display unit 43.

The display unit 43 displays various screens. The display unit 43 is a liquid crystal display or an organic EL (electroluminescence) display, for example. When the touch sensor is overlaid on the display surface of the display unit 43, the display unit 43 serves as a touch display. In the present embodiment, the display unit 43 displays a connection device registration screen 60, which will be described below with reference to FIG. 6. The connection device registration screen 60 is an user interface screen, and the information registered on the connection device registration screen 60 is transmitted to the display control device 3 by the communication unit 41. The control unit 34 of the display control device 3 reflects the information registered on the connection device registration screen 60 to the first management table 331.

The output unit 44 outputs an image signal. In addition, the output unit 44 outputs an input switching signal. The output unit 44 is connected to the first input unit 51a of the display device 5. The output unit 44 is a video interface such as an HDMI (registered trademark) terminal, for example.

The voice input and output unit 45a is connected to a speaker microphone device 100a. The voice input and output unit 45a is an example of a peripheral device connection unit, and the speaker microphone device 100a is an example of a peripheral device. The voice input and output unit 45a is an analog audio terminal, and the speaker microphone device 100a is a headset, for example.

The video input unit 45b is connected to the video capturing camera 100b. The video input unit 45b is an example of a peripheral device connection unit and the video capturing camera 100b is an example of a peripheral device. The video input unit 45b is a USB terminal, and the video capturing camera 100b is a web camera, for example.

The storage unit 46 includes a semiconductor memory such as a RAM and a ROM, for example. Furthermore, the storage unit 46 includes a storage device such as an HDD. The storage unit 46 stores a control program to be executed by the control unit 47.

The control unit 47 includes a processor such as a CPU or MPU, for example. In addition, the control unit 47 (computer) controls the operation of the first information processing device 4a based on the control program (computer program) stored in the storage unit 46. In the present embodiment, the control unit 47 serves as a device information acquisition unit 471, a command acquisition unit 472, and a switching instruction unit 473 by executing a control program.

The device information acquisition unit 471 acquires a current state of the first information processing device 4a. Specifically the device information acquisition unit 471 acquires information for indicating an application currently installed in the first information processing device 4a. In addition, the device information acquisition unit 471 acquires information for indicating an application operating in the first information processing device 4a. Further, the device information acquisition unit 471 acquires information for indicating the peripheral device currently connected to the first information processing device 4a. The information acquired by the device information acquisition unit 471 is transmitted to the display control device 3 by the communication unit 41. The control unit 34 of the display control device 3 reflects the information acquired by the device information acquisition unit 471 to the first management table 331.

The command acquisition unit 472 causes the communication unit 41 to transmit a command request signal. As a result, a command for the first information processing device 4a is issued from the display control device 3, and the command acquisition unit 472 acquires the command for the first information processing device 4a. The command request signal is transmitted to the display control device 3 periodically or at regular time intervals, for example.

The switching instruction unit 473 causes the output unit 44 to output an input switching signal. Specifically, when the output unit 44 is connected to the first input unit 51a of the display device 5, the switching instruction unit 473 causes the output unit 44 to output the input switching signal. In addition, when the command acquisition unit 472 acquires the switching command, the switching instruction unit 473 causes the output unit 44 to output the input switching signal. When the input switching signal is output from the output unit 44, the control unit 47 causes the communication unit 41 to transmit input switching information. The input switching information indicates that the input switching signal is output from the first information processing device 4a. The control unit 34 of the display control device 3 registers reception status information in the second management table 332 based on the input switching information.

The configuration of the first information processing device 4a is described above with reference to FIGS. 1, 3, and 4. Since the configuration of the second information processing device 4b is the same as that of the first information processing device 4a, a description thereof will not be repeated.

Next, the configuration of the display device 5 will be described with reference to FIGS. 1 and 5. FIG. 5 is a diagram showing the configuration of the display device 5 according to Embodiment 1. As shown in FIG. 5, the display device 5 includes an input switching unit 52, a display unit 53, a storage unit 54, and a control unit 55, as well as the first input unit 51a and the second input unit 51b described with reference to FIG. 1.

The first input unit 51a receives the image signal output from the first information processing device 4a. In addition, the first input unit 51a receives the input switching signal output from the first information processing device 4a. The image signal received by the first input unit 51a is transmitted to the input switching unit 52. The input switching signal received by the first input unit 51a is transmitted to the control unit 55.

Likewise, the second input unit 51b receives the image signal output from the second information processing device 4b. In addition, the second input unit 51b receives the input switching signal output from the second information processing device 4b. The image signal received by the second input unit 51b is transmitted to the input switching unit 52. The input switching signal received by the second input unit 51b is transmitted to the control unit 55.

The input switching unit 52 switches the display image reception unit between the first input unit 51a and the second input unit 51b. Specifically, when the first input unit 51a is set in the display image reception unit, the input switching unit 52 transmits the image signal received by the first input unit 51a to the control unit 55. Likewise, when the second input unit 51b is set in the display image reception unit, the input switching unit 52 transmits the image signal received by the second input unit 51b to the control unit 55.

The display unit 53 displays an image received by the first input unit 51a or an image received by the second input unit 51b. The display unit 53 is a liquid crystal display or an organic EL display, for example.

The storage unit 54 includes a semiconductor memory such as a RAM and a ROM, for example. Furthermore, the storage unit 54 may include a storage device such as an HDD. The storage unit 54 snores a control program to be executed by the control unit 55.

The control unit 55 includes a processor such as a CPU or MPU, for example. In addition, the control unit 55 (computer) controls the operation of the display device 5 based on the control program (computer program) stored in the storage unit 54.

In the present embodiment, the control unit 55 controls the input switching unit 52 based on the input switching signal. Specifically, when the first input unit 51*a* receives the input switching signal, the control unit 55 sets the first input unit 51*a* in the display image reception unit. In addition, when the second input unit 51*b* receives the input switching signal, the control unit 55 sets the second input unit 51*b* in the display image reception unit.

The present embodiment is described above with reference to FIGS. 1 to 5. In the present embodiment, while it is exemplified that the display control device 3 executes the voice recognition processing, in another embodiment, the instruction input device 2 may execute the voice recognition processing and transmit the recognition result text to the display control device 3.

According to the present embodiment, it is possible no control input switching of the display device 5 according to the states of the first information processing device 4*a* and the second information processing device 4*b*. Specifically, different input unit is set in the display image reception unit according to the states of toe first information processing device 4*a* and the second information processing device 4*b* even with the same user voice. For example, when the peripheral device related to the instruction correspondence application is connected only to the first information processing device 4*a* among the first information processing device 4*a* and the second information processing device 4*b*, the first input unit 51*a* is set in the display image reception unit. On the other hand, when the peripheral device related to the instruction correspondence application is connected only to the second information processing device 4*b* among the first information processing device 4*a* and the second information processing device 4*b*, the second input unit 51*b* is set in the display image reception unit.

In addition, according to the present embodiment, it is possible to determine the instruction correspondence device from among the first information processing device 4*a* and the second information processing device 4*b* according to the states of the first information processing device 4*a* and the second information processing device 4*b*. Therefore, the user only needs to utter the function to be executed, and there is no need to specify the information processing device to which the peripheral device used for executing the function is connected. As a result, the user convenience is enhanced.

Next, the connection device registration screen 60 will be described with reference to FIGS. 4 and 6. FIG. 6 is a diagram showing an example of the connection device registration screen 60. The user may set (register) information in the connection device registration screen 60 (user interface screen) by operating the operation unit 42 of the first information processing device 4*a*. The first information processing device 4*a* may transmit the image data of the user interface screen to the display device 5 and cause the display unit 53 of the display device 5 to display the user interface screen displayed on the display unit 43 of the first information processing device 4*a*.

As shown in FIG. 6, the connection device registration screen 60 displays a device name information registration column 61, a connection information registration column 62, a save button 63, and a cancel button 64. The device names of the first information processing device 4*a* and the second information processing device 4*b* are set in the device name information registration column 61. The device name is freely decided by the user.

The name of the output unit 44 of the first information processing device 4*a* connected to the first input unit 51*a* of the display device 5 is set in the connection information registration column 62. In addition, the name of the output unit 44 of the second information processing device 4*b* connected to the second input unit 51*b* of the display device 5 is set in the connection information registration column 62. Alternatively, the name of the input unit of the display device 5 connected to the output unit 44 of the first information processing device 4*a* and the name of the input unit of the display device 5 connected to the output unit 44 of the second information processing device 4*b* are set in the connection information registration column 62. In other words, the information for indicating an interface connecting each of the first information processing device 4*a* and the second information processing device 4*b* to the display device 5 is set in the connection information registration column 62, as the connection information. Specifically, a D-SUB terminal, an HDMI (registered trademark) terminal, a display port, or the like is set in the connection information registration column 62. FIG. 6 exemplifies an HDMI (registered trademark) terminal as the connection information.

The save button 63 is a button for storing the information set on the connection device registration screen 60, and when the user operates the operation unit 42 of the first information processing device 4*a* to input an instruction to press the save button 63, the communication unit 41 of the first information processing device 4*a* transmits the information set on the connection device registration screen 60 to the display control device 3.

The cancel button 64 is a button for canceling the information registration processed using the connection device registration screen 60, and when the user operates the operation unit 42 of the first information processing device 4*a* to input an instruction to press the cancel button 64, the connection device registration screen 60 is closed without saving the information set on the connection device registration screen 60.

Next, the first management table 331 will be described with reference to FIGS. 4, 6 and 7A. FIG. 7A is a diagram showing an example of the first management table 331. As shown in FIG. 7A, the first management table 331 includes a device name information column 71, a peripheral device information column 72, a connection information column 73, and an application information column 74.

In the device name information column 71, the name set in the device name information registration column 61 (FIG. 6) of the connection device registration screen 60 is reflected. In the peripheral device information column 72, the peripheral device information acquired by the device information acquisition unit 471 (FIG. 4) of the first information processing device 4*a* and the second information processing device 4*b* is reflected. In the connection information column 73, the name set in the connection information registration column 62 (FIG. 6) of the connection device registration screen 60 is reflected. In the application information column 74, the application information acquired by the device information acquisition unit 471 (FIG. 4) of the first information processing device 4*a* and the second information processing device 4*b* is reflected.

Next, the second management table 332 will be described with reference to FIGS. 3, 7A and 7B. FIG. 7B is a diagram showing an example of the second management table 332. As shown in FIG. 7B, the second management table 332 includes a device name information column 81 and a connection information column 82.

In the device name information column 81, the name of the display image output device is set. Specifically, the control unit 34 of the display control device 3 sets the name of the display image output device in the device name information column 81 with reference to the input switching information received from the first information processing device 4a or the second information processing device 4b and the device name information column 71 of the first management table 331.

In the connection information column 82, the name of the display image reception unit is set. Specifically, the control unit 34 of the display control device 3 sets the name of the display image reception unit in the connection information column 82 with reference to the input switching information received from the first information processing device 4a or the second information processing device 4b and the connection information column 73 of the first management table 331.

Figure 8:
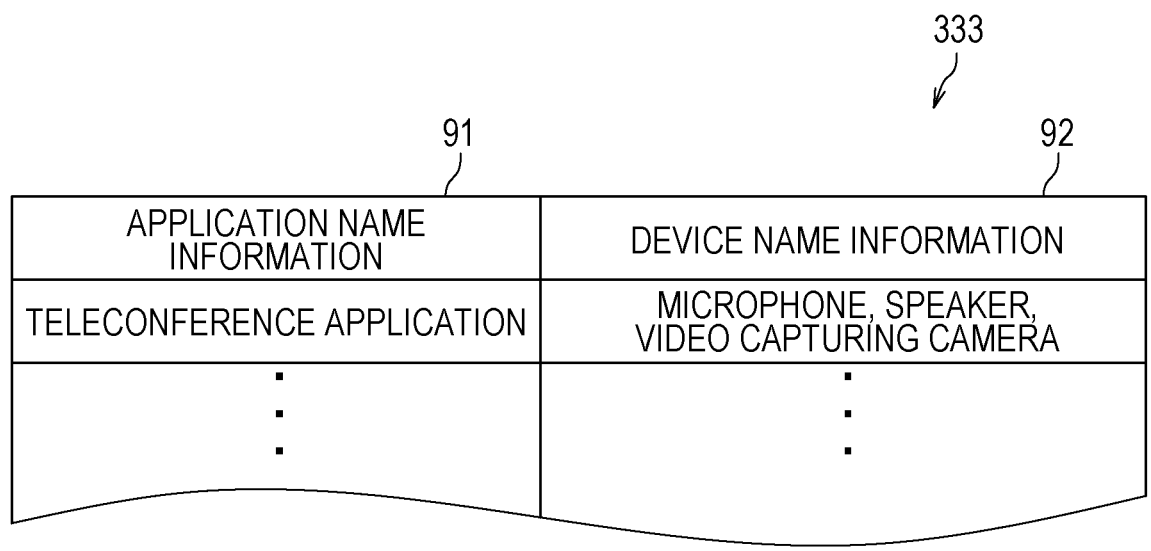
FIG. 8 is a diagram showing an example of an application using device table according to Embodiment 1 of the present disclosure.

Next, the application using device table 333 will be described with reference to FIG. 8. FIG. 8 is a diagram showing an example of the application using device table 333. As shown in FIG. 8, the application using device table 333 includes an application name information column 91 and a device name information column 92. In the application name information column 91, the name of the application is registered. In the device name information column 92, the name of the peripheral device related to the application registered in the application name information column 91 is registered.

Figure 9:
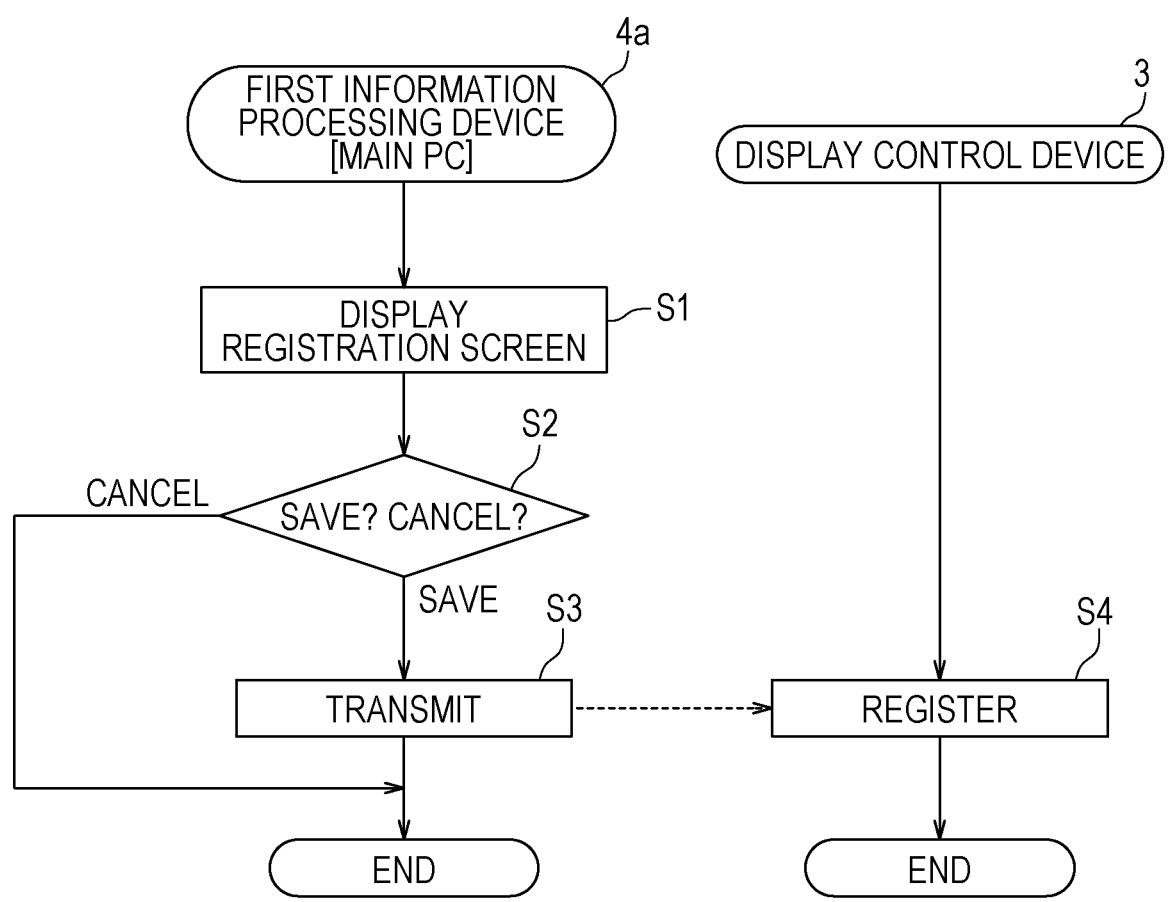
FIG. 9 is a diagram showing a first registration processing according to Embodiment 1 of the present disclosure.

Next, the first registration processing will be described with reference to FIGS. 3, 4, 7A and 9. The first registration processing is a process of registering the device names of the first information processing device 4a and the second information processing device 4b, respectively, and a name of an interface connecting the first information processing device 4a and the second information processing device 4b to the display device 5, respectively, by using the connection device registration screen 60. FIG. 9 is a diagram showing a first registration processing.

When the user operates the operation unit 42 of the first information processing device 4a to input an instruction to display the connection device registration screen 60 on the display unit 43 of the first information processing device 4a, the process shown in FIG. 9 starts.

As shown in FIG. 9, when the user inputs an instruction to display the connection device registration screen 60, the control unit 47 of the first information processing device 4a causes the display unit 43 of the first information processing device 4a to display the connection device registration screen 60 (step S1).

When the instruction to display the connection device registration screen 60 is input to the display unit 43 of the first information processing device 4a, the control unit 47 of the first information processing device 4a determines which one of the save button 63 or the cancel button 64 on the connection device registration screen 60 is pressed (step S2).

When the user operates the operation unit 42 of the first information processing device 4a to press the save button 63 (step S2: save), the control unit 47 of the first information processing device 4a transmits the information set on the connection device registration screen 60 to the display control device 3 (step S3), and ends the processing. In addition, when the user operates the operation unit 42 of the first information processing device 4a to press the cancel button 64 (step S2; cancel), the control unit 47 of the first information processing device 4a ends the processing without transmitting the information set on the connection device registration screen 60 to the display control device 3.

The control unit 34 of the display control device 3 registers the information received from the first information processing device 4a in the first management table 331 (step S4), and ends the processing.

Figure 10:
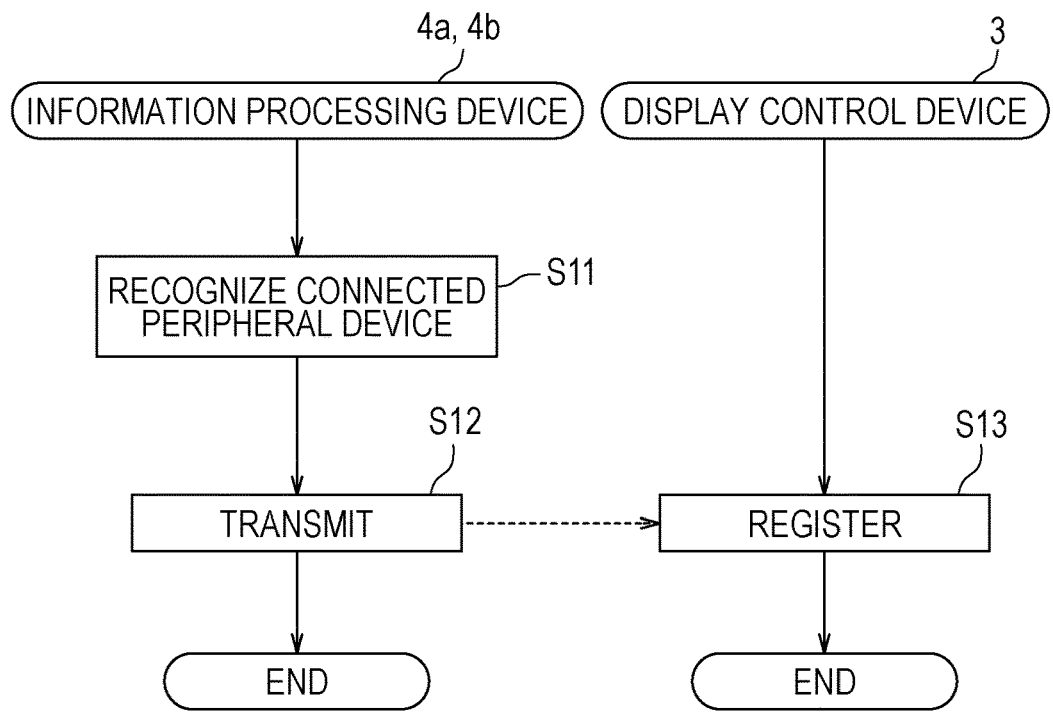
FIG. 10 is a diagram showing a second registration processing according to Embodiment 1 of the present disclosure.

Next, the second registration processing will be described with reference to FIGS. 3, 4, and 10. The second registration processing is a process of registering the peripheral device information. FIG. 10 is a diagram showing a second registration processing. When the control unit 47 of the first information processing device 4a recognizes that the peripheral device is connected to the peripheral device connection unit of the first information processing device 4a, the process shown in FIG. 10 starts. Likewise, when the control unit 47 of the second information processing device 4b recognizes that the peripheral device is connected to the peripheral device connection unit of the second information processing device 4b, the process shown in FIG. 10 starts. Hereinafter, the second registration processing will be described with reference to the case in which the peripheral device is connected to the first information processing device 4a, by way of an example.

As shown in FIG. 10, when a peripheral device is connected to the peripheral device connection unit of the first information processing device 4a, the control unit 47 (device information acquisition unit 471) of the first information processing device 4a recognizes the peripheral device connected to the peripheral device connection unit of the first information processing device 4a (step S11). In other words, the control unit 47 (device information acquisition unit 471) of the first information processing device 4a acquires information for indicating the peripheral device connected to the peripheral device connection unit of the first information processing device 4a. Next, the control unit 47 of the first information processing device 4a transmits the acquired information (peripheral device information) to the display control device 3 (step S12), and ends the processing.

The control unit 34 of the display control device 3 registers the information for indicating the peripheral device connected to the first information processing device 4a in the first management table 331 with reference to the peripheral device information received from the first information processing device 4a and (step S13), and ends the processing.

Figure 11:
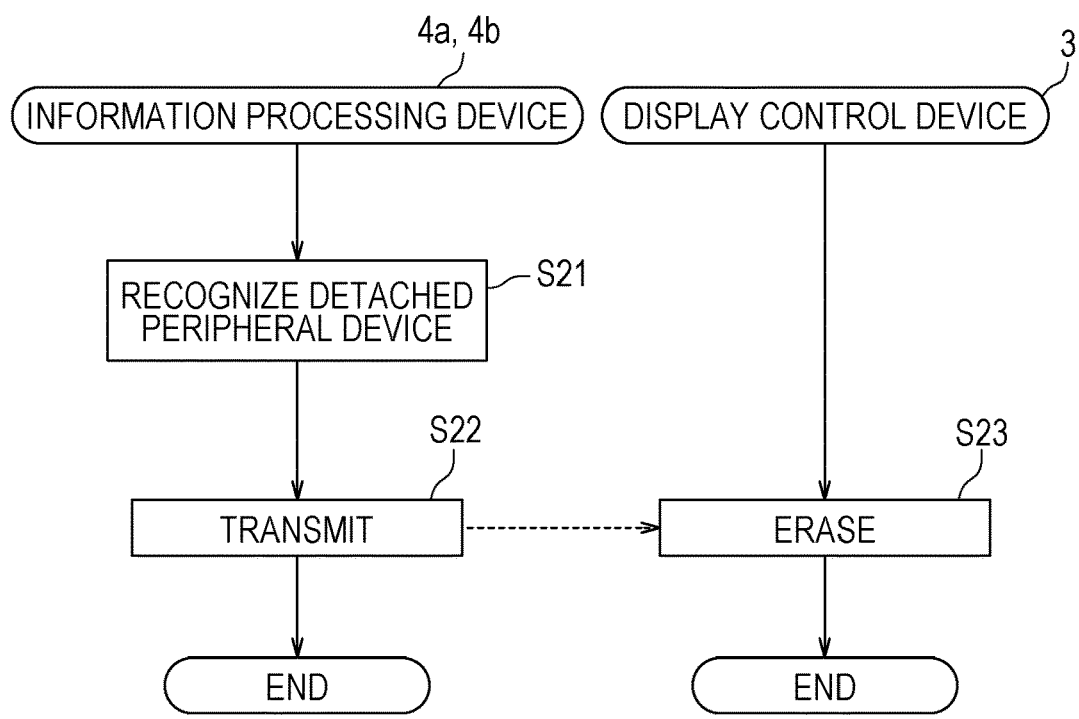
FIG. 11 is a diagram showing a third registration processing according to Embodiment 1 of the present disclosure.

Next, the third registration processing will be described with reference to FIGS. 3, 4, and 11. The third registration processing is a process of erasing the peripheral device information from the first management table 331. FIG. 11 is a diagram showing a third registration processing. When the control unit 47 of the first information processing device 4a recognizes that the peripheral device is detached from the peripheral device connection unit of the first information processing device 4a, the process shown in FIG. 11 starts. Likewise, when the control unit 47 of the second information processing device 4b recognizes that the peripheral device is detached from the peripheral device connection unit of the second information processing device 4b, the process shown in FIG. 11 starts. Hereinafter, a third registration processing will be described with reference to a case in which the peripheral device is detached from the peripheral device connection unit of the first information processing device 4a, by way of an example.

As shown in FIG. 11, when the peripheral device is detached from the peripheral device connection unit of the first information processing device 4a, the control unit 47

(device information acquisition unit 471) of the first information processing device 4*a* recognizes the peripheral device that is detached from the peripheral device connection unit of the first information processing device 4*a* (step S21). In other words, the control unit 47 (device information acquisition unit 471) of the first information processing device 4*a* acquires information for indicating the peripheral device detached from the peripheral device connection unit of the first information processing device 4*a*. Next, the control unit 47 of the first information processing device 4*a* transmits the acquired information (peripheral device information) to the display control device 3 (step S22), and ends the processing.

The control unit 34 of the display control device 3 erases the information for indicating the peripheral device detached from the first information processing device 4*a* from the first management table 331, with reference to the peripheral device information received from the first information processing device 4*a* and (step S23), and ends the processing.

Likewise the second registration processing, when the application is installed in the first information processing device 4*a*, the control unit 47 of the first information processing device 4*a* acquires information (application information) indicating the installed application and transmits the information to the display control device 3. The control unit 34 of the display control device 3 registers the information for indicating the application installed in the first information processing device 4*a* in the first management table 331, with reference to the application information received from the first information processing device 4*a*. The process of registering the information for indicating the application installed in the second information processing device 4*b* in the first management table 331 is executed in the same manner as the first information processing device 4*a*.

In addition, likewise the third registration processing, when the application is uninstalled from the first information processing device 4*a*, the control unit 47 of the first information processing device 4*a* acquires information (application information) indicating the uninstalled application and transmits the information to the display control device 3. The control unit 34 of the display control device 3 erases the information for indicating the application uninstalled from the first information processing device 4*a* from the first management table 331, with reference to the application information received from the first information processing device 4*a*. The process of erasing the information for indicating the application uninstalled from the second information processing device 4*b* from the first management table 331 is also executed in the same manner.

Figure 12:
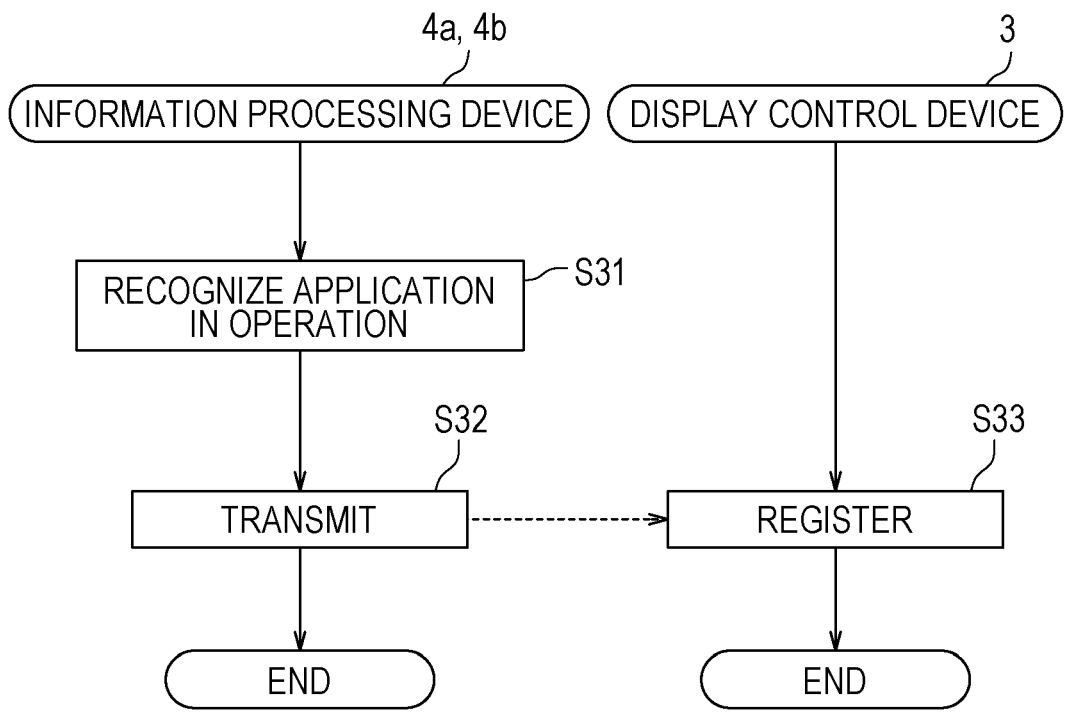
FIG. 12 is a diagram showing a fourth registration processing according to Embodiment 1 of the present disclosure.

Next, the fourth registration processing will be described with reference to FIGS. 3, 4, and 12. The fourth registration processing is a process of registering the application information. FIG. 12 is a diagram showing a fourth registration processing. When the control unit 47 of the first information processing device 4*a* recognizes that the application installed in the first information processing device 4*a* starts operating, the processing shown in FIG. 12 starts. Likewise, when the control unit 47 of the second information processing device 4*b* recognizes that the application installed in the second information processing device 4*b* starts operating, the process shown in FIG. 12 starts. Hereinafter, the fourth registration processing will be described with reference to a case in which the application installed in the first information processing device 4*a* starts operating, by way of an example.

As shown in FIG. 12, when the application installed in the first information processing device 4*a* starts operating, the control unit 47 (device information acquisition unit 471) of the first information processing device 4*a* determines that the application is in operation (step S31). In other words, the control unit 47 of the first information processing device 4*a* (device information acquisition unit 471) acquires information for indicating the application in operation. Next, the control unit 47 of the first information processing device 4*a* transmits the acquired information (application information) to the display control device 3 (step S32), and ends the processing.

The control unit 34 of the display control device 3 registers the information for indicating that the application installed in the first information processing device 4*a* is in operation in the first management table 331 (step S33), with reference to the application information received from the first information processing device 4*a*, and ends the processing.

Figure 13:
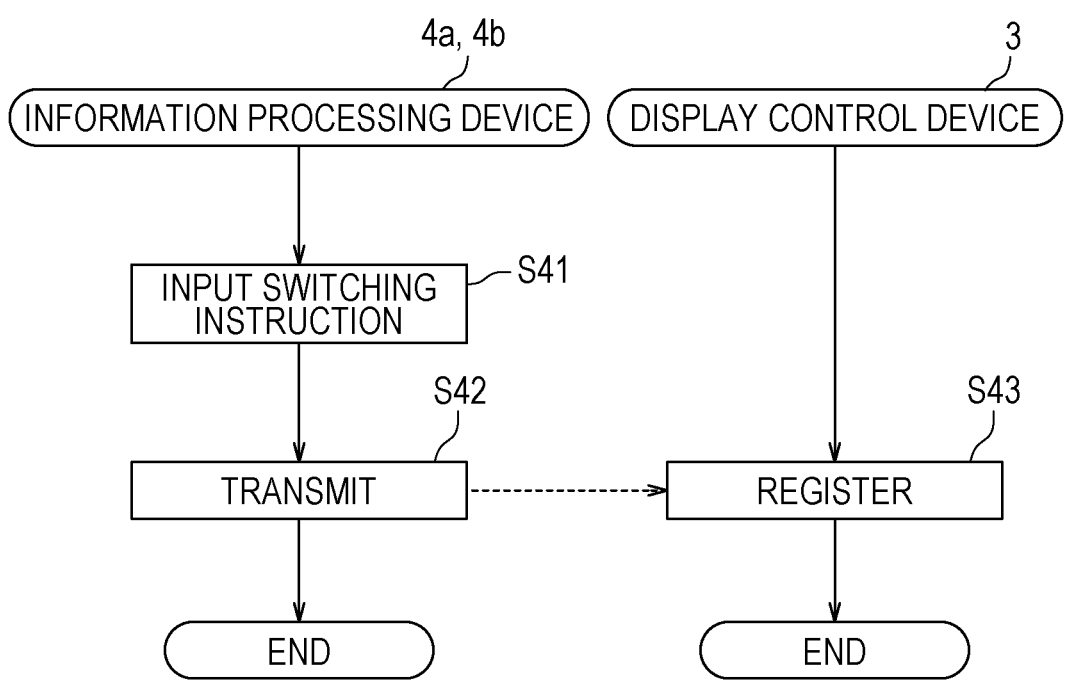
FIG. 13 is a diagram showing a fifth registration processing according to Embodiment 1 of the present disclosure.

Next, the fifth registration processing will be described with reference to FIGS. 3, 4, and 13. The fifth registration processing is a process of registering the reception status information. FIG. 13 is a diagram showing the fifth registration processing. When an input switching signal is output from the output unit 44 of the first information processing device 4*a*, the processing shown in FIG. 13 starts. Likewise, when an input switching signal is output from the output unit 44 of the second information processing device 4*b*, the process shown in FIG. 13 is started. Hereinafter, the fifth registration processing will be described with reference to a case in which an input switching signal is output from the output unit 44 of the first information processing device 4*a*, by way of an example.

As shown in FIG. 13, when the control unit 47 of the first information processing device 4*a* (switching instruction unit 473) causes the output unit 44 of the first information processing device 4*a* to output an input switching signal (step S41), the control unit 47 of the first information processing device 4*a* transmits the input switching information to the display control device 3 (step S42), and ends the processing.

The control unit 34 of the display control device 3 registers the reception status information in the second management table 332 (step S43) with reference to the input switching information received from the first information processing device 4*a* and the device name information column 71 and the connection information column 73 of the first management table 331, and ends the processing.

Figure 14:
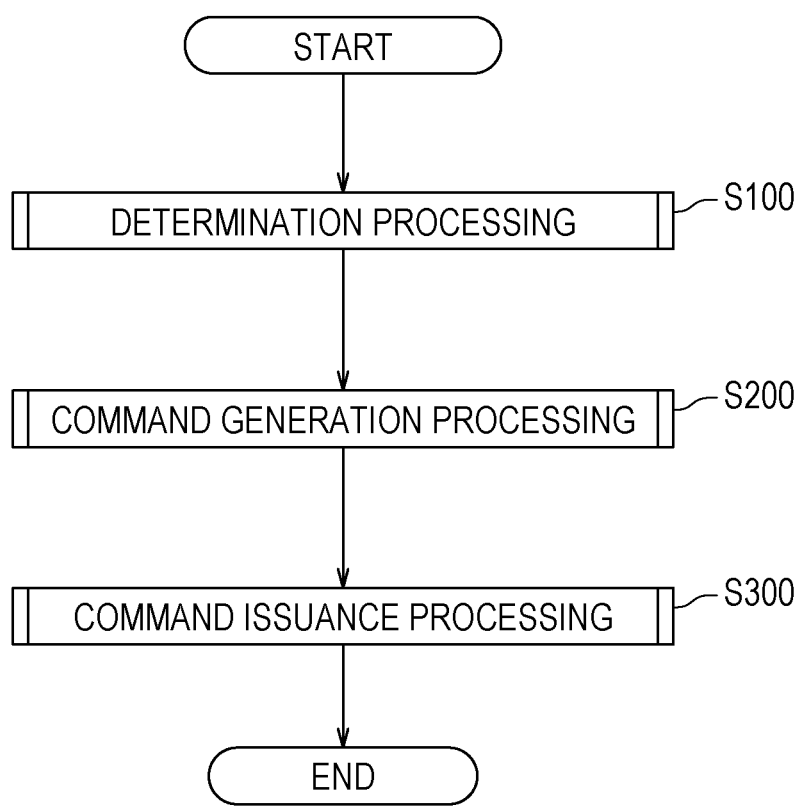
FIG. 14 is a diagram showing a process executed by a control unit of the display control device according to Embodiment 1 of the present disclosure.

Next, a processing executed by the control unit 34 of the display control device 3 will be described with reference to FIGS. 1, 3, and 14. FIG. 14 is a diagram showing the processing executed by the control unit 34 of the display control device 3. The process shown in FIG. 14 starts when the display control device 3 receives voice data from the instruction input device 2.

As shown in FIG. 14, the processing executed by the control unit 34 includes a determination processing (step S100), a command generation processing (step S200), and a command issuance processing (step S300).

Specifically, when the display control device 3 receives the voice data from the instruction input device 2, the control unit 34 (determination unit 341) determines the content of the instruction from the user (step S100).

Next, the control unit 34 (command generation unit 342) generates a command to be issued to the first information processing device 4*a* or to the second information processing device 4*b* based on the result of determination in step S100 and the information stored in the storage unit 33 of the display control device 3 (step S200). The command generated by the control unit 34 is stored in the storage unit 33 of the display control device 3.

When a command request signal is transmitted from the first information processing device 4a, the control unit (command issuance unit 343) reads a command to be issued to the first information processing device 4a from the storage unit 33, issues the command to the first information processing device 4a (step S300), and ends the processing. Likewise, when a command request signal is transmitted from the second information processing device 4b, the control unit 34 (command issuance unit 343) reads a command to be issued to the second information processing device 4b from the storage unit 33, issues the command to the second information processing device 4b (step S300), and ends the processing.

Figure 15:
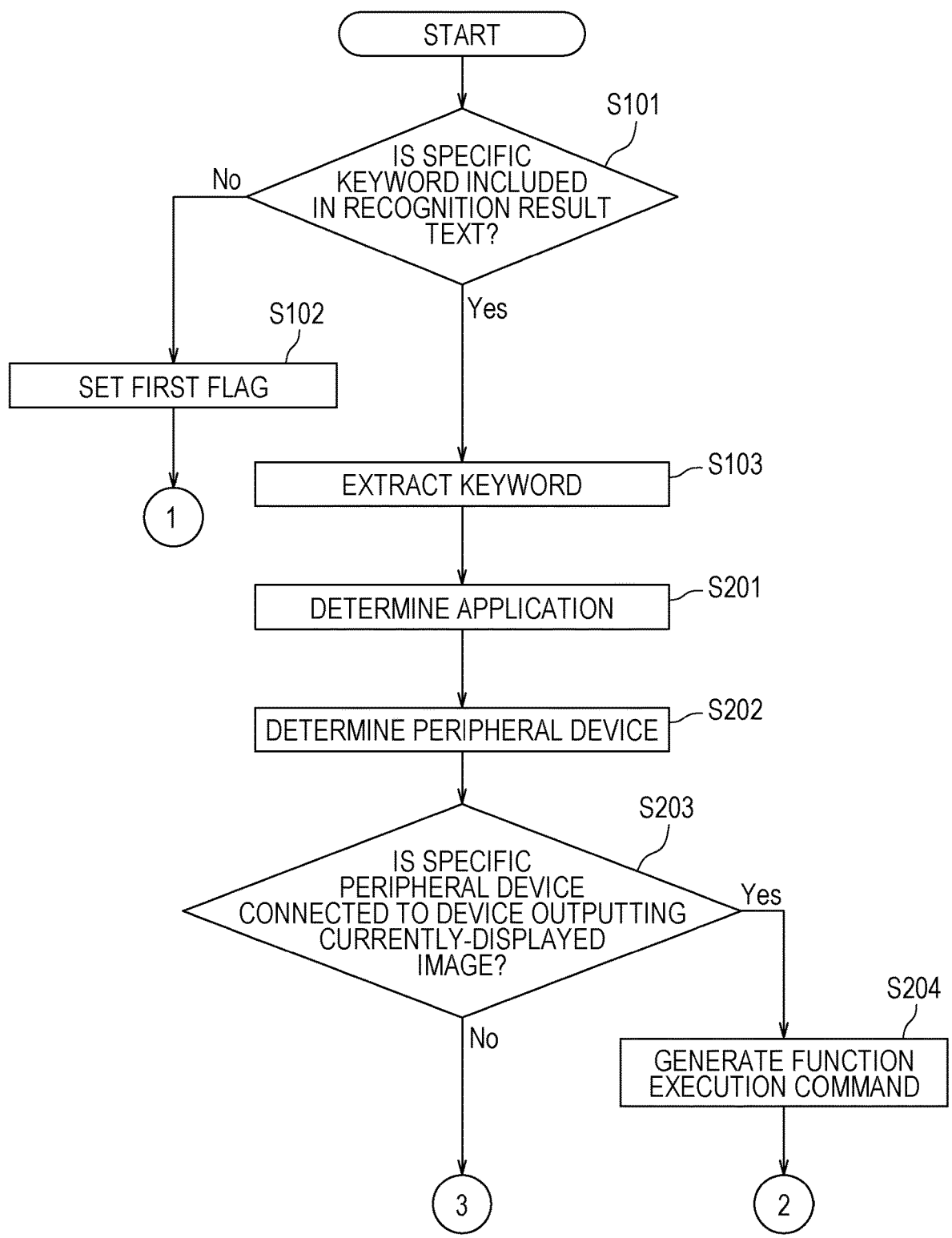
FIG. 15 is a diagram showing a process executed by the control unit of the display control device according to Embodiment 1 of the present disclosure.
Figure 16:
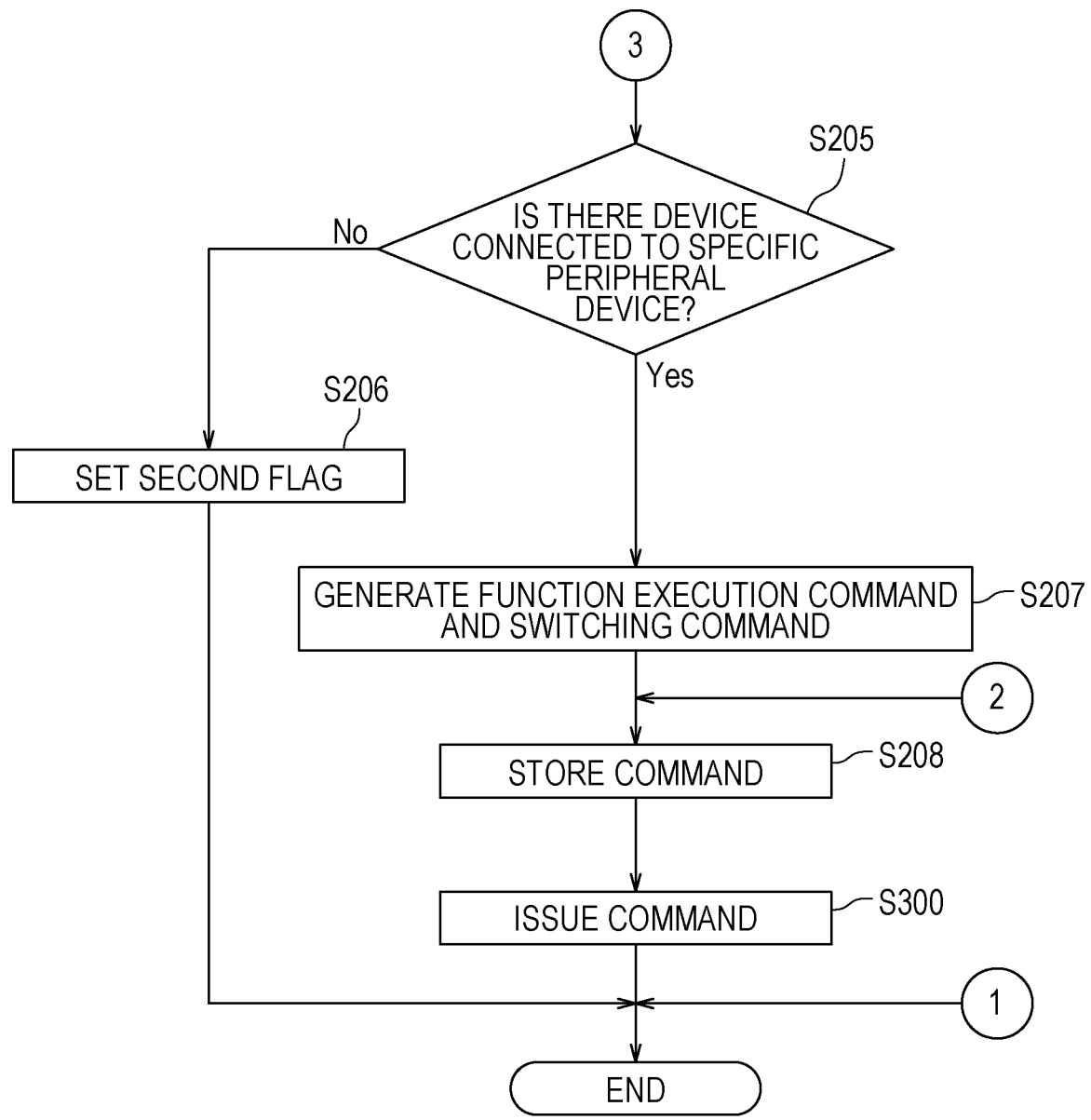
FIG. 16 is a diagram showing a process executed by the control unit of the display control device according to Embodiment 1 of the present disclosure.

Next, an example of the processing (determination processing, command generation processing, and command issuance processing) executed by the control unit 34 of the display control device 3 will be described with reference to FIGS. 1, 3, 7A, 7B, 15 and 16. FIGS. 15 and 16 are diagrams showing an example of the processing executed by the control unit 34 of the display control device 3 according to Embodiment 1.

In the processing shown in FIGS. 15 and 16, the processing in steps S101 to S103 is an example of the determination processing, and the processing in steps S201 to S208 is an example of the command generation processing. The processing shown in FIGS. 15 and 16 starts when the voice recognition unit 32 generates the recognition result text.

When the voice recognition unit 32 generates the recognition result text, the control unit 34 (determination unit 341) determines whether or not a specific keyword is included in the recognition result text (step S101). Specifically, the control unit 34 (determination unit 341) determines whether or not the keyword registered in the keyword table 334 is included in the recognition result text.

When it is determined that the keyword registered in the keyword table 334 is not included in the recognition result text (No in step S101), the control unit 34 sets a first flag (step S102), and ends the processing shown in FIGS. 15 and 16. The first flag indicates that the keyword registered in the keyword table 334 is not included in the recognition result text.

When it is determined that the keyword registered in the keyword table 334 is included in the recognition result text. (Yes in step S101), the control unit 34 (determination unit 341) extracts the keyword registered in the keyword table 334 from the recognition result text (step S103). For example, when the user voice is "Connect a video conference to Mr. ○○", the control unit 34 (determination unit 341) extracts "Mr. ○○" and "video conference" from the recognition result text.

Next, the control unit 34 (command generation unit 342) determines the instruction correspondence application based on the extracted keyword (step S201). For example, when "Mr. ○○" and "video conference" are extracted from the recognition result text, the instruction correspondence application is determined to be a teleconference application.

Next, the control unit 34 (command generation unit 342) determines a specific peripheral device related to the instruction correspondence application, by referring to the application using device table 333 (step S202). For example, when the instruction correspondence application is a teleconference application, it is determined that the specific peripheral device is "microphone", "speaker", and "camera".

Next, the control unit 34 (command generation unit 342) determines whether or not the specific peripheral device related to the instruction correspondence application is connected to the information processing device (display image output device) outputting the image displayed by the display device 5, with reference to the first management table 331 and the second management table 332 (step S203). For example, as shown in FIG. 7B, when the display image output device is the second information processing device 4b, the control unit 34 (command generation unit 342) determines whether or not the "microphone", "speaker", and "camera" are connected to second information processing device 4b.

When determining that the specific peripheral device is connected to the display image output device (Yes in step S203), the control unit 34 (command generation unit 342) generates the first function execution command or the second activation execution command depending on whether or not the instruction correspondence application of the display image output device is in operation (step S204). The control unit 34 (command generation unit 342) determines whether or not the instruction correspondence application of the display image output device is in operation, with reference to the first management table 331. When generating a command, the control unit 34 (command generation unit 342) causes the storage unit 33 to store the generated command (step S208 shown in FIG. 16).

On the other hand, when determining that the specific peripheral device is not connected to the display image output device (No in step S203), the control unit 34 (command generation unit 342) determines whether or not there is a peripheral device connection device, which is an information processing device connected to the specific peripheral device, with reference to the first management table 331, as shown in FIG. 16 (step S205).

When determining that there is no peripheral device connection device (No in step S205), the control unit 34 sets a second flag (step S206), and ends the processing shown in FIGS. 15 and 16. The second flag indicates the absence of the peripheral device connection device.

When determining that there is the peripheral device connection device (Yes in step S205), the control unit 34 generates a switching command to be issued to the peripheral device connection device (step S207). In addition, the first function execution command or the second activation execution command is generated depending on whether or not the instruction correspondence application installed in the peripheral device connection device is in operation (step S207).

For example, in the examples shown in FIGS. 7A and 7B, since "microphone", "speaker", and "camera" are not connected to the second information processing device 4b which is a display image output device, the control unit 34 (command generation unit 342) determines whether or not "microphone", "speaker", and "camera" are, connected to the first information processing device 4a (step S205).

In the example shown in FIGS. 7A and 7B, since "microphone", "speaker", and "camera" are connected to the first information processing device 4a (Yes in step S205), the control unit 34 (command generation unit 342) generates a switching command to be issued to the first information processing device 4a (step S207). In addition, since the teleconference application of the first information processing device 4a is not in operation, the control unit (command generation unit 342) generates the first function execution command (step S207).

The control unit 34 (command generation unit 342) causes the storage unit 33 to store the generated command (step S208). Thereafter, the control unit 34 (command issuance unit 343) executes the command issuance process described with reference to FIG. 14 (step S300) and ends the processing shown in FIGS. 15 and 16. For example, in the example shown in FIG. 7A and FIG. 7B, the switching command and the first function execution command are transmitted to the first information processing device 4a. As a result, the teleconference application of the first information processing device 4a connects the teleconference to "Mr. ○○", and the display device 5 displays the image output from the first information processing device 4a.

Figure 17:
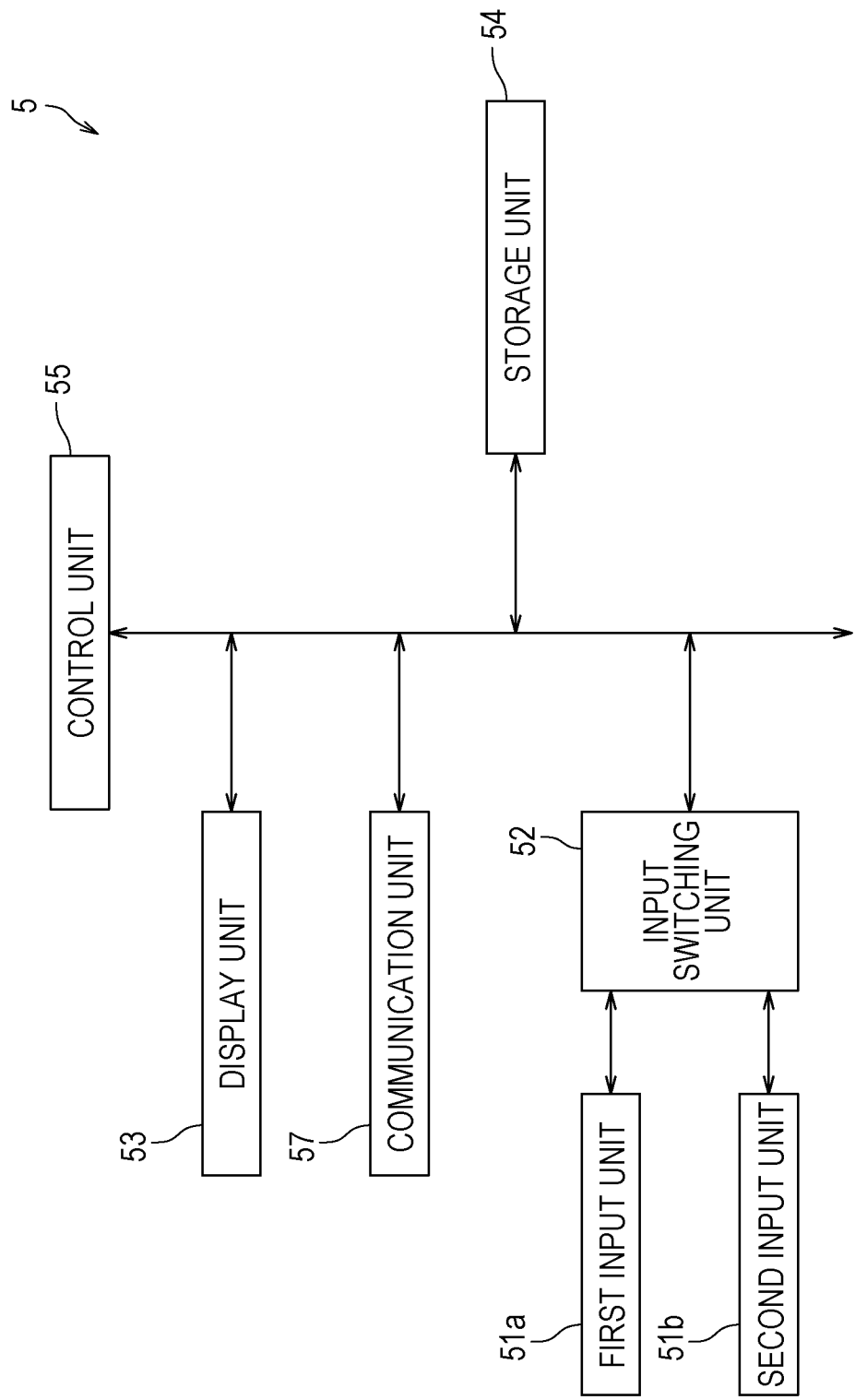
FIG. 17 is a diagram showing a configuration of a modification example of the display device according to Embodiment 1 of the present disclosure.

Embodiment 1 is described above with reference to FIGS. 1 to 16. In the present embodiment, while it is exemplified that the first information processing device 4a and the second information processing device 4b receive the switching command and instruct the display device 5 to switch the input, in another embodiment, the display device 5 may receive the switching command. In this case, the command generation unit 342 generates a switching command to be issued to the display device 5. In addition, as shown in FIG. 17, the display device 5 includes a communication unit 57. FIG. 17 is a diagram showing a configuration of a modification of the display device 5. The communication unit 57 transmits a command request signal to the display control device 3. In addition, the communication unit 57 receives a switching command from the display control device 3. In response to the switching command, the input unit to which the instruction correspondence device is connected is set in the display image reception unit. The communication unit 57 is a LAN board or a wireless LAN board, for example.

In the present embodiment, while it is exemplified that the device name information and the connection information of the first information processing device 4a and the second information processing device 4b are registered using the connection device registration screen 60, in another embodiment, the control unit 47 (device information acquisition unit 471) of each of the first information processing device 4a and the second information processing device 4b may acquire the device name information and connection information of the first information processing device 4a and the second information processing device 4b. In this case, it is possible that the device name information and the connection information of the first information processing device 4a and the second information processing device 4b are registered without using the connection device registration screen 60.

For example, the control unit 47 (device information acquisition unit 471) of the first information processing device 4a may acquire information for indicating the device name of the first information processing device 4a from the storage unit 46 of the first information processing device 4a, and transmit the acquired information to the display control device 3. The device name stored in the storage unit 46 of the first information processing device 4a may be a device name stored in advance or a device name registered by the user. In addition, when the output unit 44 of the first information processing device 4a is connected to the display device 5, the control unit 47 (device information acquiring unit 471) of the first information processing device 4a may acquire information for indicating the name of the output unit 44 of the first information processing device 4a from the storage unit 46 and transmit the acquired information to the display control device 3. Likewise, the control unit 47 (device information acquisition unit 471) of the second information processing device 4b may acquire the device name information and the connection information and transmit the information to the display control device 3.

Alternatively, as shown in FIG. 17, when the display device 5 includes the communication unit 57, it is possible that the device name information and the connection information of the first information processing device 4a and the second information processing device 4b are registered without using the connection device registration screen 60. More specifically, the control unit 55 of the display device 5 acquires information for indicating the device connected to the first input unit 51a and the second input unit 51b from a device connected to the first input unit 51a and the second input unit 51b. Then, the communication unit 57 transmits information for indicating the device connected to the first input unit 51a and the information for indicating the name of the first input unit 51a to the display control device 3 so that the device name information and the connection information of the first information processing device 4a are registered. Likewise, the communication unit 57 transmits the information for indicating a device connected to the second input unit 51b and the information for indicating the name of the second input unit 51b to the display control device 3 so that the device name information and the connection information of the second information processing device 4b are registered Embodiment 2.

Next, Embodiment 2 of the present disclosure will be described with reference to FIGS. 18 and 19. However, only the differences from Embodiment 1 will be described, and redundant description of those overlapping with Embodiment 1 will not be repeated. Embodiment 2 is different from Embodiment 1 in the configurations of the first information processing device 4a and the second information processing device 4b and the configuration of the display device 5.

Specifically, in Embodiment 1, the first information processing device 4a and the second information processing device 4b output the image signal and the input switching signal from one single interface (output unit 44), while the first information processing device 4a and the second information processing device 4b according to Embodiment 2 include an interface for outputting an image signal and an interface for outputting an input switching signal.

Figure 18:
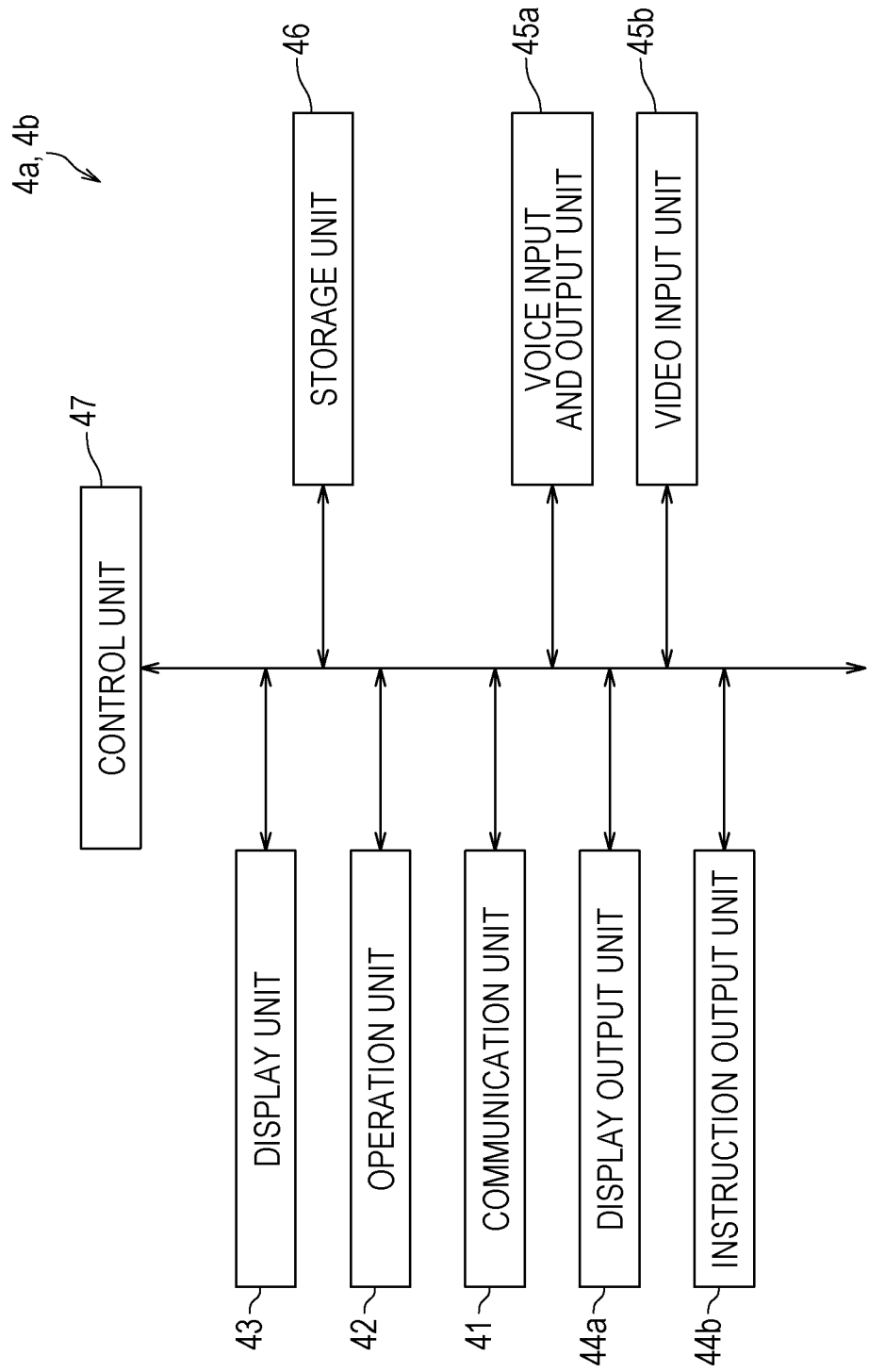
FIG. 18 is a diagram showing configurations of a first information processing device and a second information processing device according to Embodiment 2 of the present disclosure.

FIG. 18 is a diagram showing configurations of the first information processing device 4a and the second information processing device 4b according to Embodiment 2 of the present disclosure. As shown in FIG. 18, the first information processing device 4a and the second information processing device 4b according to Embodiment 2 include a display output unit 44a and an instruction output unit 44b instead of the output unit 44 described in Embodiment 1. The display output unit 44a is an interface for outputting the image signal, and the instruction output unit 44b is an interface for outputting the input switching signal. The display output unit 44a is a D-SUB terminal, an HDMI (registered trademark) terminal, or a display port, for example. The instruction output unit 44b is a LAN board or a wireless LAN board, for example.

Figure 19:
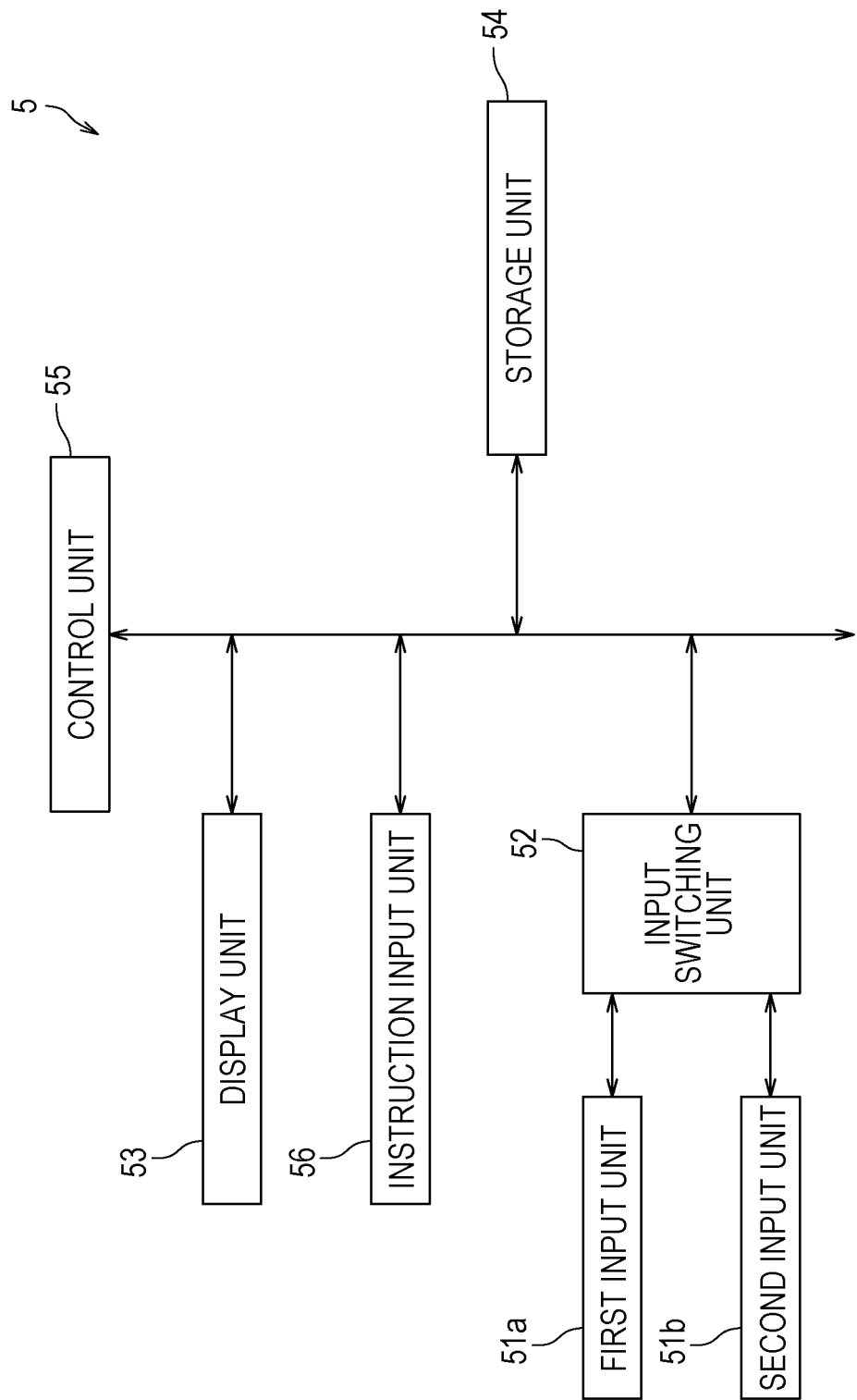
FIG. 19 is a diagram showing a configuration at a display device according to Embodiment 2 of the present disclosure.

FIG. 19 is a diagram showing a configuration of the display device 5 according to Embodiment 2. As shown in FIG. 19, the display device 5 according to Embodiment 2 includes an instruction input unit 56. The instruction input unit 56 is an interface for receiving the input switching signal. The instruction input unit 56 is a LAN board or a wireless LAN board, for example. The first input unit 51a and the second input unit 51b according to Embodiment 2 are a D-SUB terminal, an HDMI (registered trademark) or a display port, for example.

Embodiment 2 is described above with reference to FIGS. 18 and 19. According to the present embodiment, it is possible to control the input switching of the display device 5 according to the states of the first information processing device 4a and the second information processing device 4b.

In the present embodiment, while it is described that the first information processing device 4a and the second information processing device 4b have the instruction output unit 44b, in another embodiment, the communication unit 41 of the first information processing device 4a and the second information processing device 4b may serve as an interface for outputting an input switching signal. In addition, in the present embodiment, while both the first information processing device 4a and the second information processing device 4b include the interface for outputting the image signal and the interface for outputting the input switching signal, one of the first information processing device 4a and the second information processing device 4b may include the interface for outputting the image signal and the interface for outputting the input switching signal.

Embodiment 3

Next, Embodiment 3 of the present disclosure will be described with reference to FIGS. 20 to 24. However, only the differences from the first and second embodiments will be described, and redundant description overlapping with the first and second embodiments will not be repeated. Embodiment 3 is different from the first and second embodiments in the processing executed by the display control device 3 and the configurations of the first information processing device 4a and the second information processing device 4b.

Figure 20:
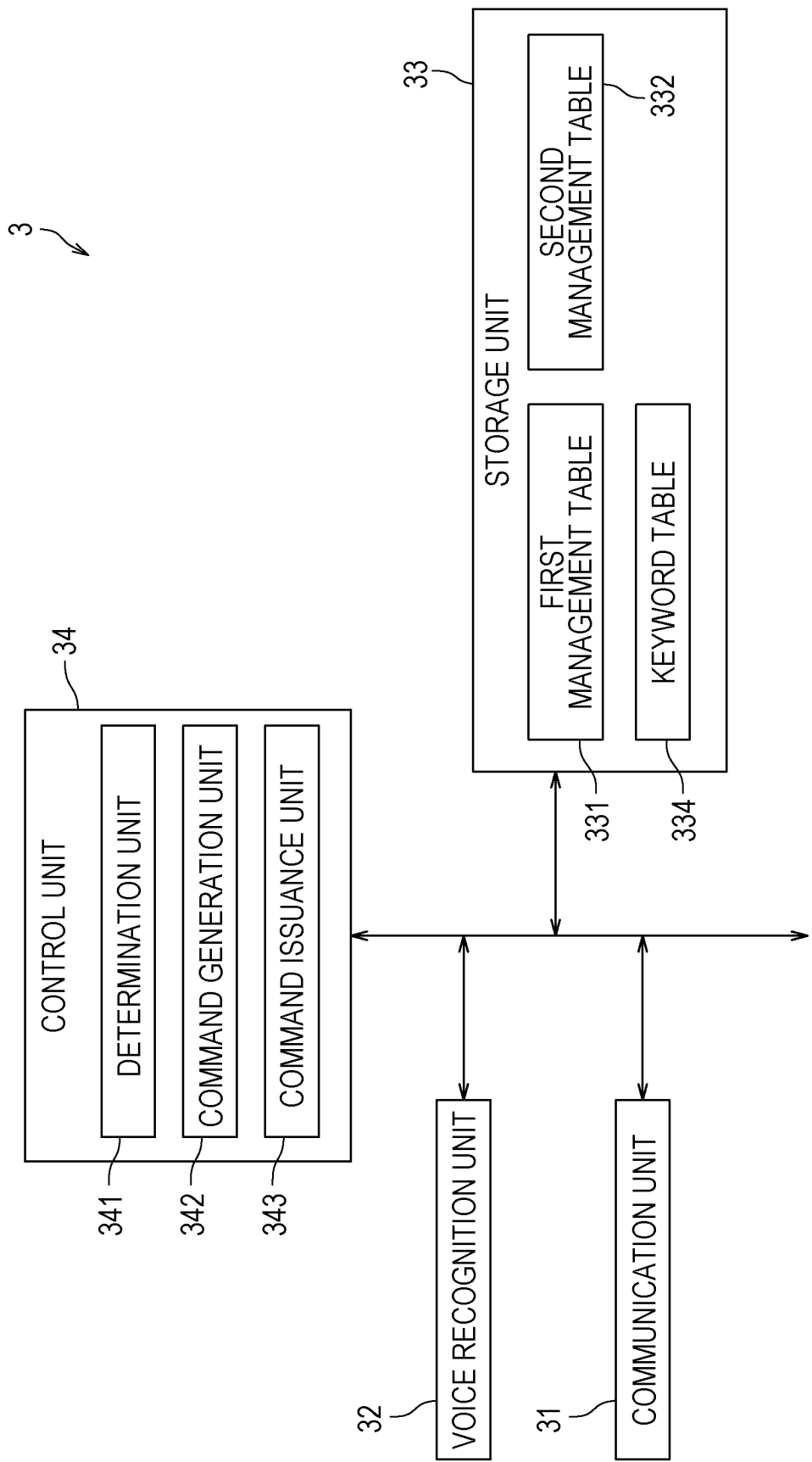
FIG. 20 is a diagram showing a configuration of a display control device according to Embodiment 3 of the present disclosure.

FIG. 20 is a diagram showing a configuration of the display control device 3 according to Embodiment 3. As shown in FIG. 20, in Embodiment 3, the storage unit 33 stores the first management table 331, the second management table 332, and the keyword table 334, and does not store the application using device table 333 described in Embodiment 1.

In the present embodiment, a keyword indicating that a specific image is to be displayed on the display device 5 is registered in the keyword table 34. For example, "Display the screen of the main PC", "Display the screen of the guest PC", and the like are registered in the keyword table 334.

In the present embodiment, when an instruction from the user is an instruction to display a specific image on the display device 5, the command generation unit 342 determines a specific image output device, which is the information processing device that outputs the specific image, from among the first information processing device 4a and the second information processing device 4b, with reference to the keyword extracted from the recognition result text by the determination unit 341. Specifically, depending on whether the keyword extracted from the recognition result text by the determination unit 341 includes a keyword indicating that the image displayed by the first information processing device 4a is to be displayed on the display device 5, or a keyword indicating that the image displayed by the second information processing device 4b is to be displayed on the display device 5, the command generation unit 342 determines one of the first information processing device 4a and the second information processing device 4b as the specific image output device.

In the present embodiment, the command generation unit 342 determines an instruction correspondence application capable of receiving and displaying the specific image. Further, the command generation unit 342 determines the display image output device with reference to the second management table 332, and determines whether or not the instruction correspondence application installed in the display image output device is in a state capable of receiving and displaying a specific image with reference to the first management table 331. In other words, the command generation unit 342 determines whether or not the instruction correspondence application is in operation. When the instruction correspondence application is not in a state capable of receiving and displaying the specific image, the command generation unit 342 generates a command for switching the display image to a specific image. Specifically, the command generation unit 342 generates a switching command for setting the input unit to which the specific image output device is connected as the display image reception unit.

In addition, in the present embodiment, when the instruction correspondence application installed in the display image output device is an application for displaying an image on the display device 5 and the instruction correspondence application is in a state capable of receiving and displaying a specific image, the command generation unit 342 generates the first function execution command to be issued to the specific image output device, and generates the first function execution command and the second function execution command to be issued to the display image output device.

The first function execution command issued to the specific image output device indicates an instruction to activate an application that causes the specific image output device to transmit the specific image to the display image output device, and to cause the application to transmit the specific image from the specific image output device to the display image output device.

The first function execution command issued to the display image output device indicates an instruction to activate an application that receives the specific image transmitted from the specific image output device to the display image output device and to cause the application to receive the specific image transmitted from the specific image output device to the display image output device. In addition, the second function execution command issued to the display image output device indicates an instruction to superimpose the specific image on the image displayed on the display device 5 by the instruction correspondence application.

Figure 21:
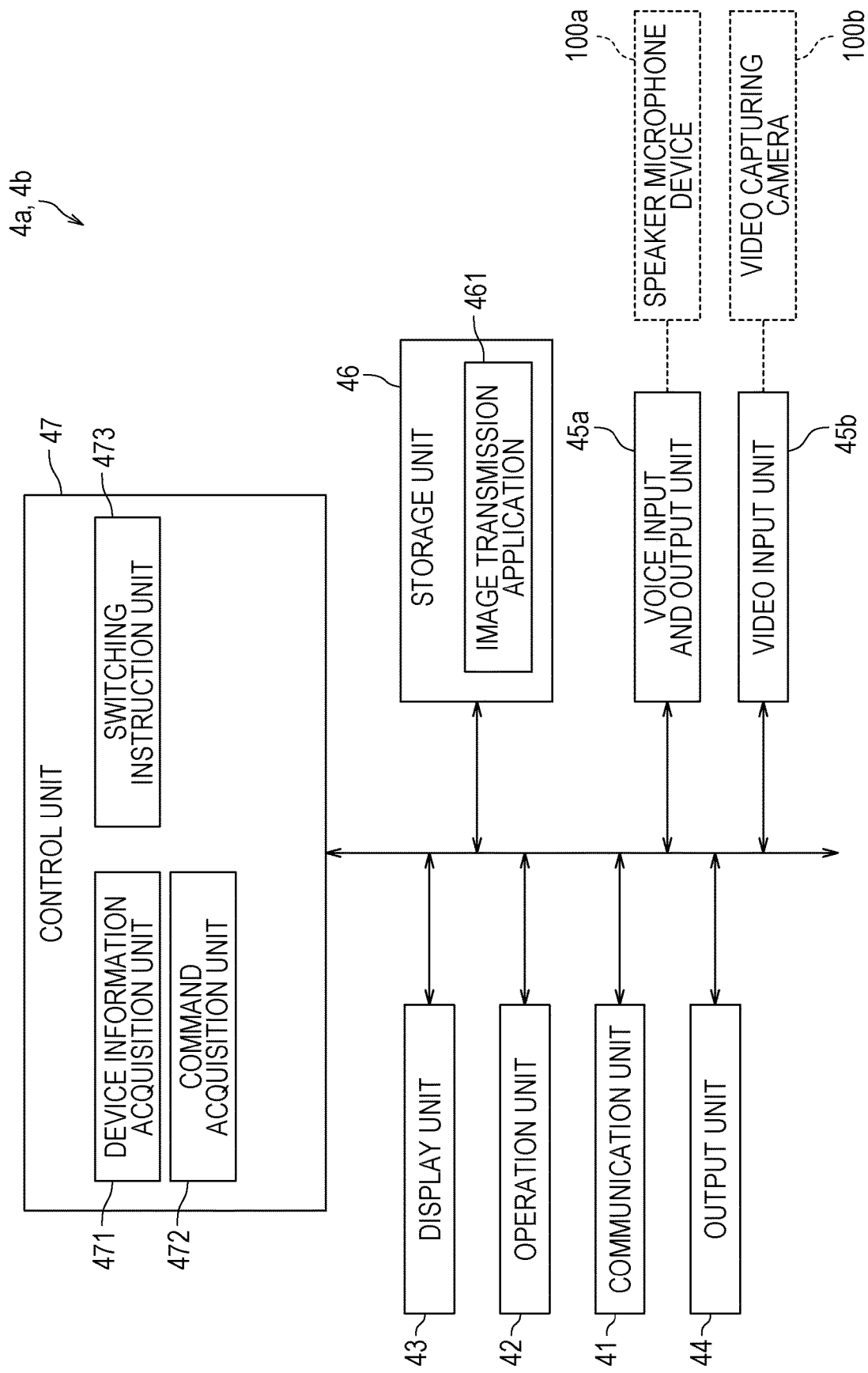
FIG. 21 is a diagram showing configurations of a first information processing device and a second information processing device according to Embodiment 3 of the present disclosure.

FIG. 21 is a diagram showing configurations of the first information processing device 4a and the second information processing device 4b according to Embodiment 3 of the present disclosure. In Embodiment 3, the communication unit 41 of the first information processing device 4a also controls communication with the second information processing device 4b as well as controlling communication with the display control device 3. Likewise, the communication unit 41 of the second information processing device 4b also controls communication with the first information processing device 4a as well as controlling communication with the display control device 3.

In addition, the storage unit 46 of the first information processing device 4a and the second information processing device 4b stores an image transmission application 461. The image transmission application 461 of the first information processing device 4a transmits the image displayed by the display unit 43 of the first information processing device 4a to the second information processing device 4b through the communication unit 41. Likewise, the image transmission application 461 of the second information processing device 4b transmits the image displayed by the display unit 43 of the second information processing device 4b to the first information processing device 4a through the communication unit 41.

Figure 23:
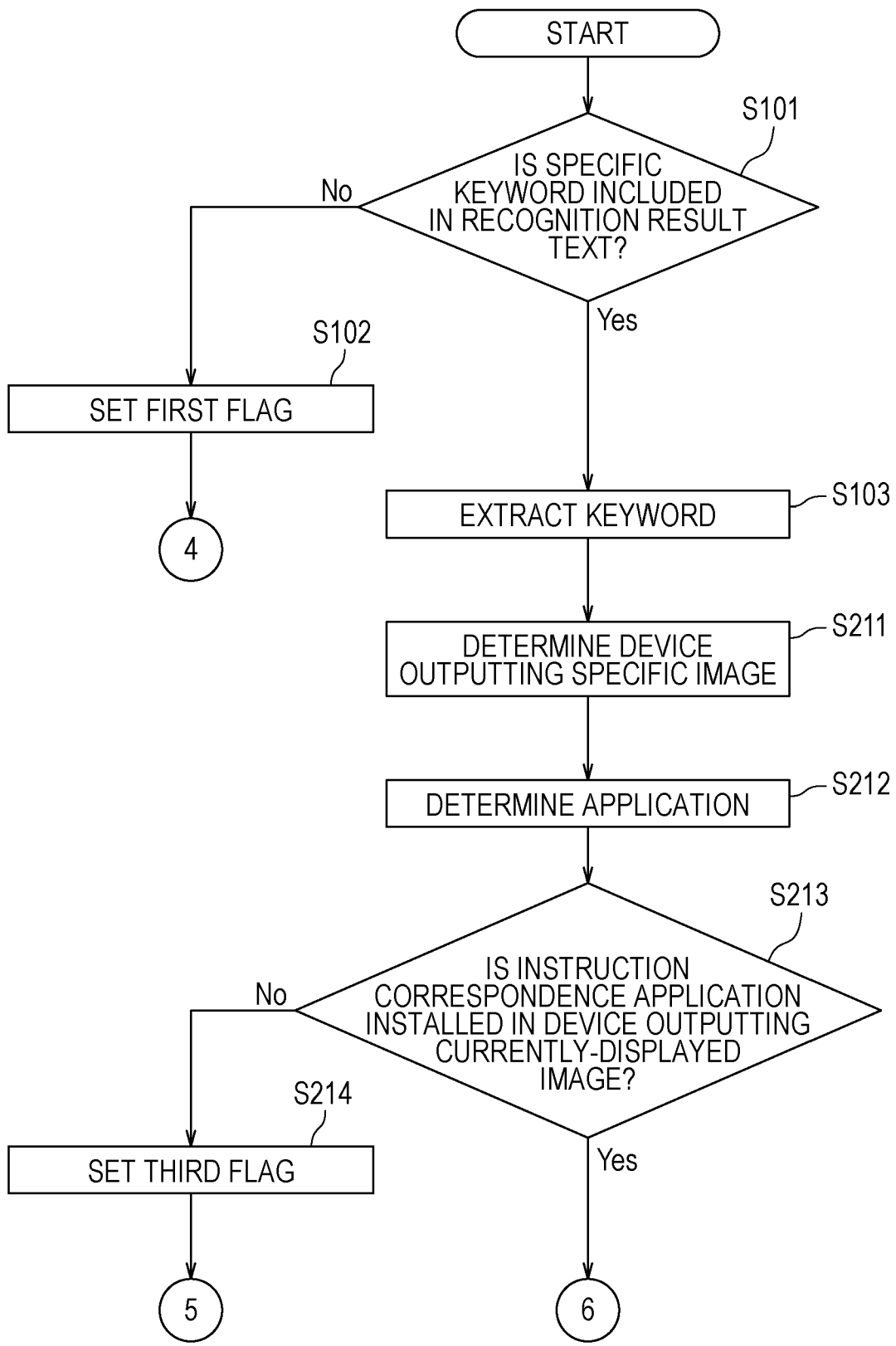
FIG. 23 is a diagram showing a process executed by the control unit of the display control device according to Embodiment 3 of the present disclosure.
Figure 24:
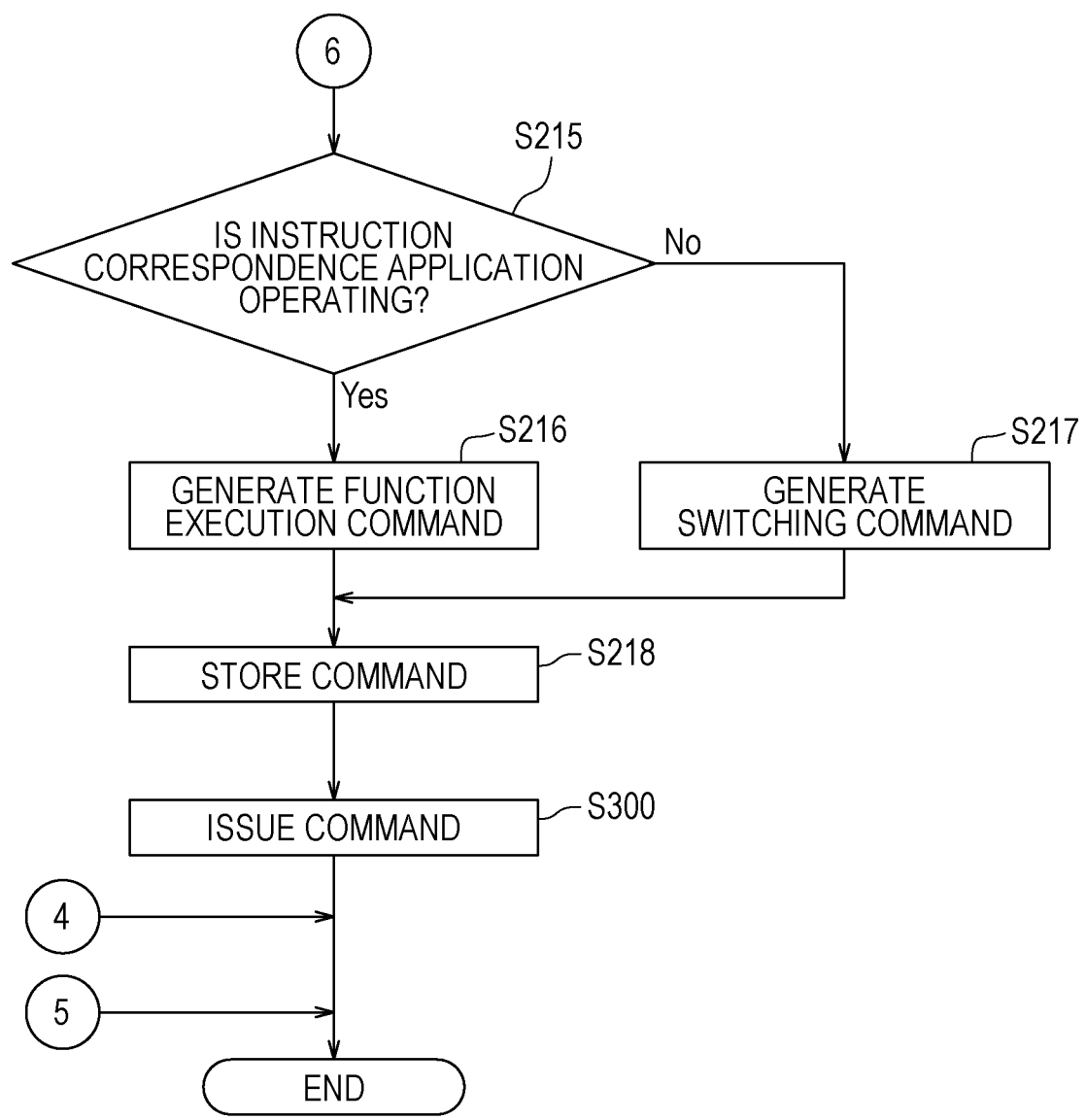
FIG. 24 is a diagram showing a process executed by the control unit of the display control device according to Embodiment 3 of the present disclosure.

Next, an example of the processing (determination processing, command generation processing, and command issuance processing) executed by the control unit 34 of the display control device 3 according to Embodiment 3 will be described with reference to FIGS. 20 to 24. FIG. 22A is a diagram showing an example of the first management table 331 according to Embodiment 3. FIG. 22B is a diagram showing an example of the second management table 332 according to Embodiment 3. FIGS. 23 and 24 are diagrams showing an example of the processing executed by the control unit 34 of the display control device 3 according to Embodiment 3.

In the processing shown in FIGS. 23 and 24, the processing in steps S101 to S103 is an example of the determination processing, and the processing in steps S211 to S218 is an example of the command generation processing. The processing shown in FIGS. 23 and 24 starts when the voice recognition unit 32 generates the recognition result text. Since the processing in steps S101 to S103 and the processing in step S300 are the same as the processing in steps S101 to S103 and the processing in step S300 described in Embodiment 1, the description thereof will not be repeated. In addition, since the processing in step S218 is the same as the processing in step S208 described in Embodiment 1, the description thereof will not be repeated.

As shown in FIG. 23, when the keyword extracted from the recognition result text is a keyword indicating that a specific image is to be displayed on the display device 5, the control unit 34 (command generation unit 342) determines the information processing device (specific image output device) that outputs the specific image from among the first information processing device 4a and the second information processing device 4b based on the extracted keyword (step S211). For example, when the keyword extracted from the recognition result text is "Display the screen of the guest PC", the control unit 34 (command generation unit 342) determines that the second information processing device 4b is the specific image output device.

Next, the control unit 34 (command generation unit 342) determines an instruction correspondence application capable of receiving and displaying the specific image (step S212). For example, the control unit 34 (command generation unit 342) determines that the teleconference application is the instruction correspondence application.

Next, the control unit 34 (command generation unit 342) determines whether or not the instruction correspondence application is installed in the information processing device (display image output device) outputting the image displayed by the display device 5, with reference to the first management table 331 and the second management table 332 (step S213).

When determining that the instruction correspondence application is not installed in the display image output device (No in step S213), the control unit 34 (command generation unit 342) sets a third flag (step S214), and ends the processing shown in FIGS. 23 and 24. The third flag indicates that the instruction correspondence application is not installed in the display image output device.

When determining that the instruction correspondence application is installed in the display image output device (Yes in step S213), as shown in FIG. 24, the control unit 34 (command generation unit 342) determines whether or not the instruction correspondence application is operating with reference to the first management table 331 (step S215).

When determining that the instruction correspondence application is operating (Yes in step S215), the control unit 34 (command generation unit 342) generates the first function execution command to be issued to the specific image output device, and generates the first function execution command and the second function execution command to be issued to the display image output device (step S216).

When determining that the instruction correspondence application is not operating (No in step S215), the control unit 34 (command generation unit 342) generates the switching command to be issued to the specific image output device (step S217).

In the example shown in FIGS. 22A and 22B, the first information processing device 4a is the display image output device, and the teleconference application is installed in the first information processing device 4a. In addition, the teleconference application of the first information processing device 4a is in operation, and an image is displayed on the display device 5. Therefore, the control unit 34 (command generation unit 342) generates the first function execution command for activating the image transmission application 461 installed in the second information processing device 4b (specific image output device), and for transmitting the image displayed by the second information processing device 4b to the first information processing device 4a. In addition, the control unit 34 (command generation unit 342) generates the first function execution command for activating the image transmission application 461 installed the first information processing device 4a (display image output device) and for receiving the image transmitted from the second information processing device 4b. Furthermore, the control unit 34 (command generation unit 342) generates the second function execution command for superimposing the image transmitted from the second information processing device 4b on the display image. As a result, the teleconference application of the first information processing device 4a superimposes the image transmitted from the second information processing device 4b on the display image. On the other hand, when the teleconference application of the first information processing device 4a is not in operation, the image output from the second Information processing device 4b is displayed on the display device 5.

Embodiment 3 is described above with reference to FIGS. 20 to 24. According to the present embodiment, it is possible to control the input switching of the display device 5 according to the states of the first information processing device 4a and the second information processing device 4b. Specifically, different input units are set in the display image reception unit even with the same user voice, depending on the states of the first information processing device 4a and the second information processing device 4b. For example, when the instruction correspondence application is operating, the display image reception unit is not changed. On the other hand, when the instruction correspondence application is not operating, the input unit connected to the specific image output device is set in the display image reception unit.

Further, in the present embodiment, while use of the image transmission application 461 is described, when the teleconference application is installed in both the display image output device and the specific image output device, it is possible that the teleconference application of the specific image output device is activated to execute a screen sharing function of the teleconference applications of the display image output device and the specific image output device.

The embodiments according to the present disclosure are described above with reference to the drawings. However, the present disclosure is not limited to the embodiments described above, and can be implemented in various modes without departing from the gist thereof.

For example, the processing executed by the display control device 3 according to Embodiment 1 and the processing executed by the display control device 3 according to Embodiment 3 may be combined. In this case, the control unit 34 of the display control device 3 may execute one of the processing described in Embodiment 1 and the processing described in Embodiment 3, according to the keywords extracted from the recognition result text.

In the embodiment of the present disclosure, while the instruction input device 2 is exemplified as the voice input device, the instruction input device 2 may be any device that is capable of inputting instructions from the user, and is not limited to the voice input device. For example, the instruction input device 2 may be a tablet terminal or an information processing device such as a PC.

In addition, in the embodiments of the present disclosure, while it is exemplified that the instruction of the user is determined using the keyword, the process of determining the instruction of the user may be the intention estimation processing. When the control unit 34 of the display control device 3 executes the intention estimation processing, the storage unit 33 of the display control device 3 stores a corpus instead of the keyword table 334.

In addition, in the embodiment of the present disclosure, while it is exemplified that the display control device 3 includes one information processing device, the display control device 3 may include a plurality of information processing devices.

In the embodiment of the present disclosure, while it is exemplified that the first information processing device 4a, the second information processing device 4b, and the display device 5 request a command to the display control device 3, in another embodiment, the display control device 3 may issue a command to the first information processing device 4a, the second information processing device 4b, and the display device 5 without a request for command from the first information processing device 4a, the second information processing device 4b, and the display device 5 to the display control device 3.

In the embodiments of the present disclosure, while it is exemplified that the display control system 1 includes the instruction input device 2, the first information processing device 4a or the second information processing device 4b may be used as the instruction input device 2.

In addition, while the embodiments of the present disclosure are described with reference to the case where the display device 5 includes two input units (first input unit 51a and second input unit 51b), in another embodiment, the display device 5 may include three or more input units. In other words, the display control system 1 may include three or more information processing devices.

The present disclosure is useful for a system using a display device such as a conference system, a lecture system, and a lesson system.

The present disclosure contains subject matter related to that disclosed in Japanese Priority Patent Application JP 2018-027015 filed in the Japan Patent Office on Feb. 19, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control device that controls a display device, wherein the display device includes two or more input units to which information processing devices are connected,
the display control device comprises:
a storage unit that stores device information for indicating a state of each of the information processing devices and reception status information for indicating one of the information processing devices, which outputs a display image displayed by the display device;
a determination unit that determines a content of an instruction from a user; and
a command generation unit that generates a command to be issued to at least one of the display device and the information processing devices based on a determination result of the determination unit and the information stored in the storage unit,
the device information includes information for indicating a peripheral device connected to the information processing device, information for indicating application software installed in the information processing device, and information for indicating whether or not the application software is in operation, and
the command generation unit
determines first application software which is used for executing the instruction,
determines a specific peripheral device related to the first application software,
determines an instruction correspondence device which is one of the information processing devices to which the specific peripheral device is connected, from among the information processing devices, and
generates a first command for switching the display image displayed by the display device to an image to be output from the instruction correspondence device.

2. The display control device according to claim 1, wherein the command generation unit further generates a second command for causing the first application software installed in the instruction correspondence device to execute a function corresponding to the instruction.

3. The display control device according to claim 1, wherein
when the instruction is an instruction that causes the display device to display a first image,
the command generation unit
determines a specific image output device, which is one of the information processing devices that outputs the first image, from among the information processing devices,
determines second application software capable of causing receiving and displaying of the first image,
determines whether or not the second application software is in a state of being capable of receiving and displaying the first image, and
generates a third command for switching the display image displayed by the display device to the first image, when the second application software is not in the state of being capable of receiving and displaying the first image.

4. The display control device according to claim 3,
wherein, when the second application software is application software for causing the display device to display a second image, and the second application software is in the state of being capable of receiving and displaying the first image, the command generation unit generates a fourth command for superimposing the first image on the second image.

5. The display control device according to claim 1, further comprising:
a voice recognition unit that recognizes a voice of the user,
wherein the determination unit determines a content of an instruction from the user based on a recognition result of the voice recognition unit.

6. A display control system comprising:
a display device; and
a display control device that controls the display device,
wherein the display device includes two or more input units to which information processing devices are connected,
the display control device includes
a storage unit that stores device information for indicating a state of each of the information processing devices and reception status information for indicating one of the information processing devices, which outputs a display image displayed by the display device,
a determination unit that determines a content of an instruction from a user, and
a command generation unit that generates a command to be issued to at least one of the display device and the information processing devices based on a determination result of the determination unit and the information stored in the storage unit,
the display device displays an image corresponding to the command,
the device information includes information for indicating a peripheral device connected to the information processing device, information for indicating application software installed in the information processing device, and information for indicating whether or not the application software is in operation, and
the command generation unit
determines first application software which is used for executing the instruction,
determines a specific peripheral device related to the first application software,
determines an instruction correspondence device which is one of the information processing devices to which the specific peripheral device is connected, from among the information processing devices, and
generates a command for switching the display image displayed by the display device to an image to be output from the instruction correspondence device.

7. A display control method for controlling a display device,
wherein the display device includes two or more input units to which information processing devices are connected,
the display control method comprises:
storing device information for indicating a state of each of the information processing devices and reception status information for indicating one of the information processing devices, which outputs a display image displayed by the display device;
determining a content of an instruction from a user;
generating a command to be issued to at least one of the display device and the information processing devices based on a result determined in the determining and the information stored in the storing; and
displaying an image corresponding to the command by the display device,
the device information includes information for indicating a peripheral device connected to the information processing device, information for indicating application software installed in the information processing device, and information for indicating whether or not the application software is in operation, and
the generating a command includes
determining first application software which is used for executing the instruction,
determining a specific peripheral device related to the first application software,
determining an instruction correspondence device which is one of the information processing devices to which the specific peripheral device is connected, from among the information processing devices, and
generating a command for switching the display image displayed by the display device to an image to be output from the instruction correspondence device.

\* \* \* \* \*